US011873833B2

United States Patent

(12) United States Patent
Yamamoto et al.

(10) Patent No.: US 11,873,833 B2
(45) Date of Patent: Jan. 16, 2024

(54) AXIAL-FLOW FAN, AND OUTDOOR UNIT FOR AIR-CONDITIONING APPARATUS

(71) Applicant: Mitsubishi Electric Corporation, Tokyo (JP)

(72) Inventors: Katsuyuki Yamamoto, Tokyo (JP); Takahide Tadokoro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/002,677

(22) PCT Filed: Sep. 2, 2020

(86) PCT No.: PCT/JP2020/033229
§ 371 (c)(1),
(2) Date: Dec. 21, 2022

(87) PCT Pub. No.: WO2022/049665
PCT Pub. Date: Mar. 10, 2022

(65) Prior Publication Data

US 2023/0235750 A1 Jul. 27, 2023

(51) Int. Cl.
*F04D 29/38* (2006.01)
*F24F 1/38* (2011.01)

(52) U.S. Cl.
CPC .............. *F04D 29/384* (2013.01); *F24F 1/38* (2013.01); *F05D 2240/303* (2013.01);
(Continued)

(58) Field of Classification Search
CPC .... F04D 29/384; F24F 1/38; F05D 2240/303; F05D 2240/304; F05D 2250/711; F05D 2250/74; F05D 2250/71
See application file for complete search history.

(56) References Cited

U.S. PATENT DOCUMENTS

2007/0258822 A1 11/2007 Spaggiari
2015/0240645 A1 8/2015 Yokose et al.

FOREIGN PATENT DOCUMENTS

CN 106151105 A 11/2016
JP H08-165999 A 6/1996
(Continued)

OTHER PUBLICATIONS

International Search Report of the International Searching Authority dated Oct. 20, 2020 for the corresponding international application No. PCT/JP2020/033229 (and English translation).
(Continued)

*Primary Examiner* — Jacob M Amick
*Assistant Examiner* — Charles J Brauch
(74) *Attorney, Agent, or Firm* — POSZ LAW GROUP, PLC

(57) ABSTRACT

An axial-flow fan includes a hub that is to be rotated and defines a rotation axis, and a vane provided on a circumference of the hub. The vane includes a leading edge, a trailing edge, an outer circumferential edge, and an inner circumferential edge. The vane is shaped such that a first line chart in a first diagram includes a downward convex portion that is convex further downward than a first virtual line chart, the first virtual line chart being a linear line connecting a point representing a size of an outlet angle formed at a point of the trailing edge that is at the inner circumferential edge and a point representing a size of the outlet angle formed at a point of the trailing edge that is at the outer circumferential edge.

19 Claims, 32 Drawing Sheets

Comparative Example

(52) U.S. Cl.
CPC .................. *F05D 2240/304* (2013.01); *F05D 2250/711* (2013.01); *F05D 2250/74* (2013.01)

(56) References Cited

FOREIGN PATENT DOCUMENTS

| | | | | |
|---|---|---|---|---|
| JP | H09-144697 | A | | 6/1997 |
| JP | 2007-113474 | A | | 5/2007 |
| JP | 2014-058902 | A | | 4/2014 |
| JP | 2014-080970 | A | | 5/2014 |
| JP | 201480970 | A | * | 5/2014 |
| JP | 6373439 | B1 | | 8/2018 |

OTHER PUBLICATIONS

Extended European Search Report dated Sep. 18, 2023 issued in corresponding European patent application No. 20952405.7.

* cited by examiner

A-A SECTION

Comparative Example

Comparative Example

A1-A1 SECTION

A3-A3 SECTION

A2-A2 SECTION

Comparative Example

Comparative Example

AXIAL-FLOW FAN, AND OUTDOOR UNIT FOR AIR-CONDITIONING APPARATUS

CROSS REFERENCE TO RELATED APPLICATION

This application is a U.S. national stage application of PCT/JP2020/033229 filed on Sep. 2, 2020, the contents of which are incorporated herein by reference.

TECHNICAL FIELD

The present disclosure relates to an axial-flow fan and to an outdoor unit for an air-conditioning apparatus including an axial-flow fan.

BACKGROUND ART

Some axial-flow fan includes a plurality of vanes arranged around the peripheral face of a cylindrical boss. The vanes are rotated by a turning force applied to the boss and thus delivers fluid. In the axial-flow fan, when the vanes rotate, fluid that is present between the vanes collide with the surfaces of the vanes. The pressure on the surfaces with which the fluid collides increases and pushes the fluid in the direction of the axis of rotation of the vanes.

One of such axial-flow fans having proposed includes blades each shaped such that the center camber line in a section of the blade that is taken along a cylindrical plane centered at the rotation axis of the fan includes a linear portion located close to the leading edge of the blade, and a curved portion located close to the trailing edge of the blade (see Patent Literature 1, for example). The linear portion extends in substantially the same direction as the direction of the collisionless flow of incoming gas toward the blade surface. The curved portion extends in such a manner as to make the linear portion continuous with the direction of the flow of gas flowing out from the blade surface. In the axial-flow fan disclosed by Patent Literature 1 including the linear portion and the curved portion shaped as above, the direction of the tangent to the leading edge of the blade substantially coincides with the direction of the collisionless flow of incoming gas substantially over the entirety in the radial direction about the rotation axis. Accordingly, in the axial-flow fan disclosed by Patent Literature 1, the incoming gas received at the leading edge of the blade flows along the linear portion and is guided to the curved portion. Therefore, an almost ideal flow with no loss is considered to be generated.

CITATION LIST

Patent Literature

Patent Literature 1: Japanese Unexamined Patent Application Publication No. 9-144697

SUMMARY OF INVENTION

Technical Problem

In the axial-flow fan disclosed by Patent Literature 1, however, the vane load is not adjusted in the radial direction. Specifically, the vane load to be borne at the inner circumference of the axial-flow fan is not satisfactorily increased relative to the vane load to be borne at the outer circumference of the axial-flow fan. Therefore, the airflow on the vane surface tends to travel toward the outer circumference of the axial-flow fan under the influence of elements such as a partition provided in the outdoor unit. Such an airflow flowing out from the axial-flow fan produces a wind-speed distribution in the radial direction in which maximal possible values concentratedly appear at or near the outermost circumference, and the concentrated air collides with structures including a fan grille that are located downstream of the axial-flow fan. Consequently, increased noise is generated in the outdoor unit of the air-conditioning apparatus.

The present disclosure is to solve the above problem and to provide an axial-flow fan and an outdoor unit for an air-conditioning apparatus each configured to reduce noise that tends to be generated by air blown out when the axial-flow fan is in operation.

Solution to Problem

An axial-flow fan according to an embodiment of the present disclosure is an axial-flow fan to be included in an outdoor unit for an air-conditioning apparatus. The axial-flow fan includes a hub that is to be rotated and defines a rotation axis, and a vane provided on a circumference of the hub. The vane includes a leading edge forming an edge located forward in a rotating direction, a trailing edge forming an edge located backward in the rotating direction, an outer circumferential edge forming an edge at an outer circumference of the vane, and an inner circumferential edge connected to the hub and forming an edge at an inner circumference that is further inside than an outermost circumference of the vane. In a section of the vane that is along an axial direction of the rotation axis and along a circumferential direction of the axial-flow fan, in a case in which an angle formed between a virtual line intersecting the trailing edge and being parallel to the rotation axis and a virtual line representing a direction in which the trailing edge faces is defined as an outlet angle of the vane, a first diagram is set in which a horizontal axis represents a distance on the trailing edge in a radial direction of the axial-flow fan from the inner circumferential edge to the outer circumferential edge while a vertical axis represents a size of the outlet angle, and a relationship between the size of the outlet angle and the distance on the trailing edge in the radial direction from the inner circumferential edge is represented as a first line chart, the vane is shaped such that the first line chart in the first diagram includes a downward convex portion that is convex further downward than a first virtual line chart, the first virtual line chart being a linear line connecting a point representing a size of the outlet angle formed at a point of the trailing edge that is at the inner circumferential edge and a point representing a size of the outlet angle formed at a point of the trailing edge that is at the outer circumferential edge.

An outdoor unit for an air-conditioning apparatus according to another embodiment of the present disclosure includes a housing including a wall having an air outlet, the axial-flow fan configured as above that is housed in the housing, and a bell mouth provided at the air outlet and surrounding an outer circumference of the axial-flow fan.

Advantageous Effects of Invention

According to an embodiment of the present disclosure, the axial-flow fan and the outdoor unit for an air-conditioning apparatus each include the vane shaped such that the first line chart includes the downward convex portion that is convex further downward than the first virtual line chart.

When the downward convex portion is provided, the vane having such a portion includes, at the inner circumference of the vane, a part where the outlet angle is smaller, with the presence of the downward convex portion, than in a vane that forms the first virtual line chart. Accordingly, the vane load to be borne is increased at the part forming the downward convex portion. Therefore, in the axial-flow fan including the downward convex portion, the vane load to be borne at the inner circumference is increased satisfactorily relative to the vane load to be borne at the outer circumference, whereby the airflow on the vane surface is induced toward the inner circumference. Thus, the air blown from the axial-flow fan produces a wind-speed distribution that is even in the radial direction. Consequently, the axial-flow fan that is set in the outdoor unit generates reduced noise that tends to occur at the collision with structures including the fan grille that are located downstream of the axial-flow fan.

DESCRIPTION OF EMBODIMENTS

Figure 1:
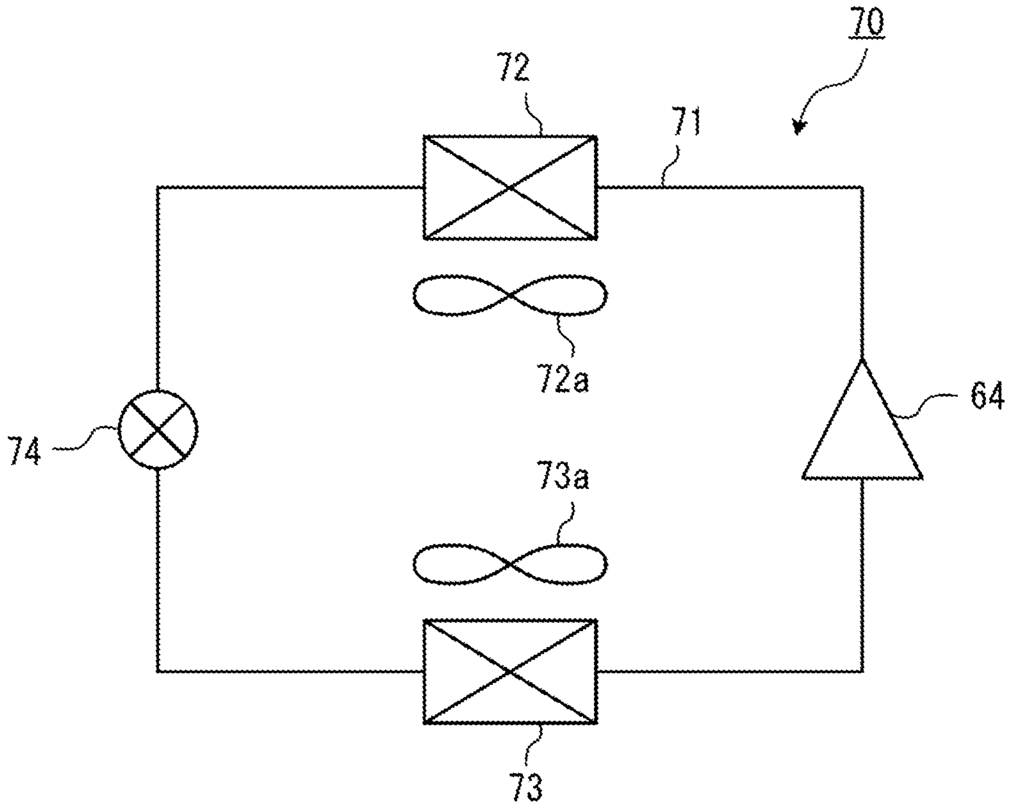
FIG. 1 outlines an air-conditioning apparatus according to Embodiment 1.

Elements of an air-conditioning apparatus 70, including an outdoor unit 50, according to each of the embodiments will be described below with reference to the drawings. In the drawings, including FIG. 1, to be referred to below, factors such as relative sizes and shapes of individual elements may be different from those of actual elements. In the drawings to be referred to below, the same reference signs denote the same or equivalent elements, which applies throughout this specification. For easy understanding, terms indicating directions (such as “upper”, “lower”, “right”, “left”, “front”, and “rear”) will be used accordingly. Such terms, however, are only for convenience of description and do not limit the arrangements or orientations of the apparatus and individual elements.

Embodiment 1

[Air-Conditioning Apparatus 70]

FIG. 1 outlines an air-conditioning apparatus 70 according to Embodiment 1. As illustrated in FIG. 1, the air-conditioning apparatus 70 includes a refrigerant circuit 71, in which a compressor 64, a condenser 72, an expansion valve 74, and an evaporator 73 are connected to one another in that order by refrigerant pipes. The condenser 72 is provided with a condenser fan 72*a*, which sends air for heat exchange to the condenser 72. The evaporator 73 is provided with an evaporator fan 73*a*, which sends air for heat exchange to the evaporator 73. The refrigerant circuit 71 of the air-conditioning apparatus 70 may further include a flow switching device, such as a four-way valve, configured to change the flow of refrigerant such that the operation is switchable between a heating operation and a cooling operation.

[Outdoor Unit 50]

Figure 2:
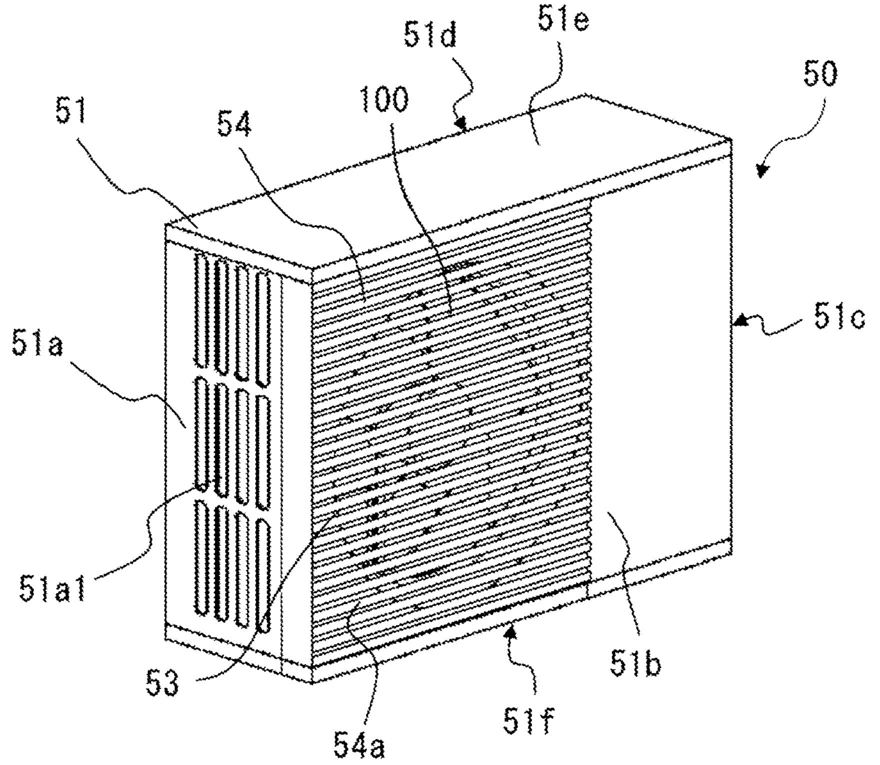
FIG. 2 is a perspective view of an outdoor unit according to Embodiment 1.
Figure 3:
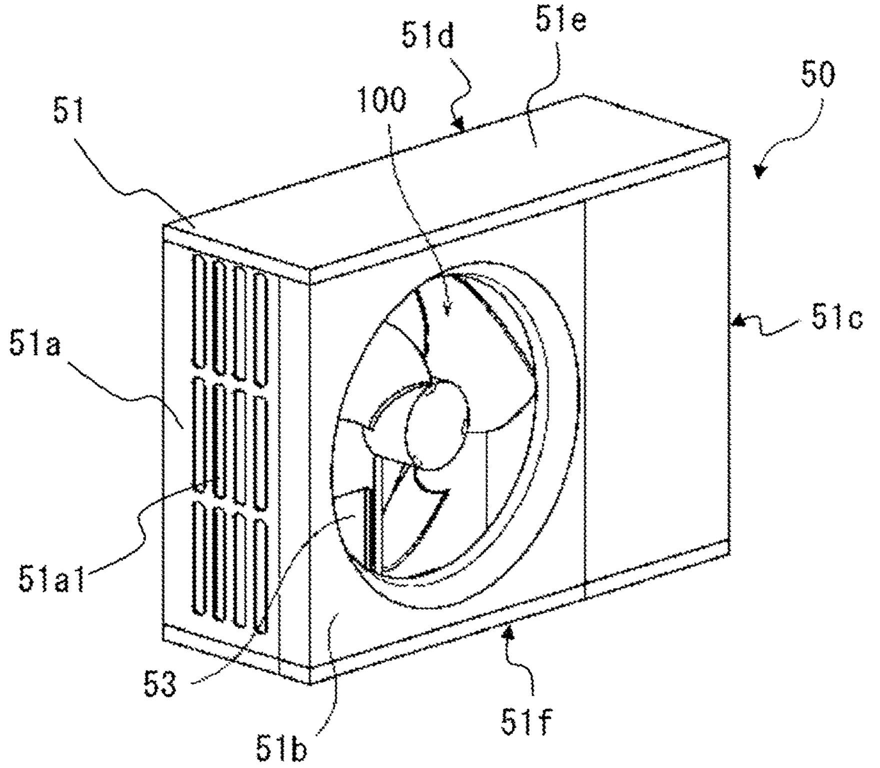
FIG. 3 is a perspective view of the outdoor unit according to Embodiment 1 from an air outlet of the outdoor unit.
Figure 4:
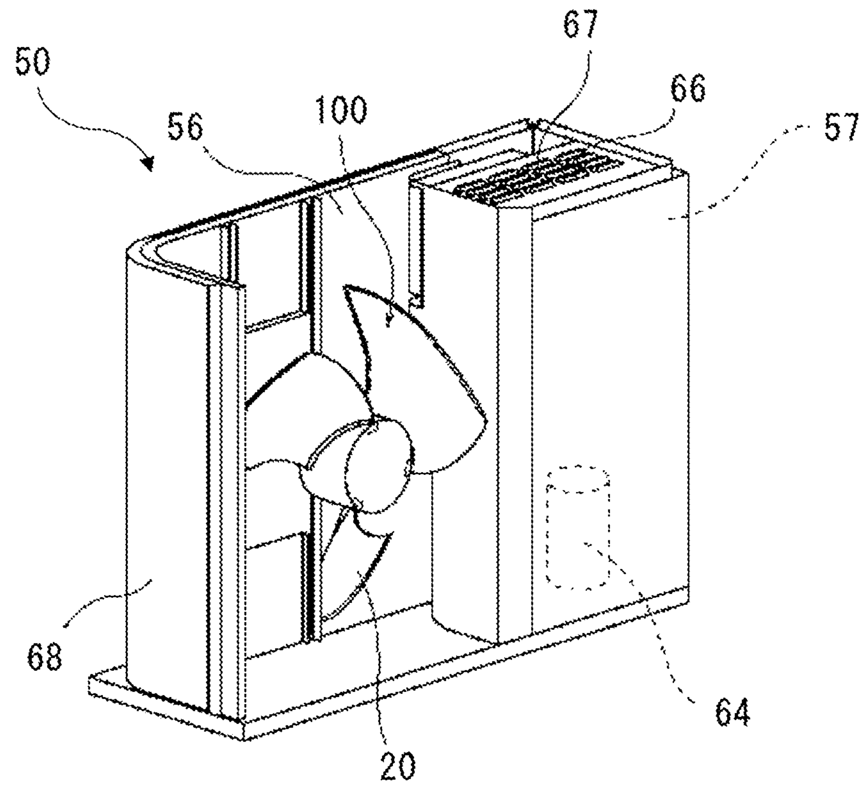
FIG. 4 is a perspective view of the outdoor unit with a front wall and other components removed for illustrating the internal configuration of the outdoor unit.
Figure 5:
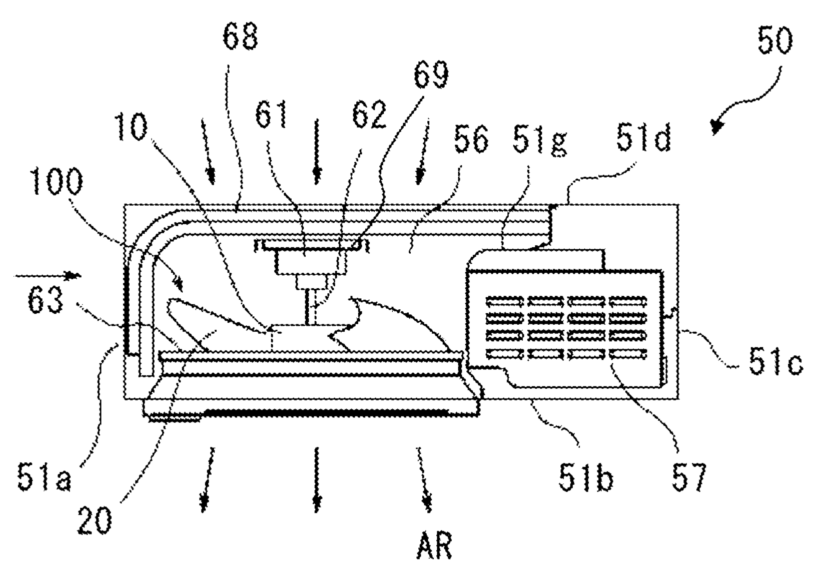
FIG. 5 is a conceptual diagram for illustrating the internal configuration of the outdoor unit in top view.

FIG. 2 is a perspective view of an outdoor unit 50 according to Embodiment 1. FIG. 3 is a perspective view of the outdoor unit 50 according to Embodiment 1 from an air outlet 53 of the outdoor unit 50. FIG. 4 is a perspective view of the outdoor unit 50 with a front wall 51*b* and other components removed for illustrating the internal configuration of the outdoor unit 50. FIG. 5 is a conceptual diagram for illustrating the internal configuration of the outdoor unit 50 in top view. FIG. 3 does not illustrate a fan grille 54, which is provided at the air outlet 53, for illustrating the configuration of the outdoor unit 50 in the air outlet 53.

The outdoor unit 50 includes a housing 51, which serves as an outer shell of the outdoor unit 50. As illustrated in FIGS. 2 and 3, the housing 51 has a cuboidal box shape. The housing 51 includes a front wall 51*b*, which forms the front face of the housing 51; a rear wall 51*d*, which forms the rear face of the housing 51; a top plate 51*e*, which forms the upper face of the housing 51; a bottom plate 51*f*, which forms the lower face of the housing 51; and a lateral wall 51*a* and a lateral wall 51*c*, which form a pair of left and right lateral faces of the housing 51.

The lateral wall 51*a* of the housing 51 has openings 51*a*1, through which air on the outside is taken in. The rear wall 51*d* of the housing 51 has openings (not illustrated), through which air on the outside is taken in. The front wall 51*b* of the housing 51 has the air outlet 53, which serves as an opening through which air on the inside of the housing 51 is blown to the outside.

The air outlet 53 is covered by the fan grille 54. Therefore, any matter outside the housing 51 of the outdoor unit 50 is prevented from coming into contact with an axial-flow fan 100, whereby safety is ensured. In FIG. 3, arrows AR represent airflow. The fan grille 54 includes, among bars, a plurality of bars 54*a*, each extending in the horizontal direction. The bars 54*a* are some bars among bars of various forms and each extend in the horizontal direction.

The bars 54*a* each have a plate shape extending between the lateral wall 51*a* and the lateral wall 51*c*. The plurality of bars 54*a* of the fan grille 54 are vertically spaced apart from one another. When the axial-flow fan 100 is in operation, air to be exhausted from the inside of the outdoor unit 50 to the outside passes through the gaps between the adjacent bars 54*a* of the fan grille 54.

As illustrated in FIGS. 4 and 5, the housing 51 houses the axial-flow fan 100, which is rotatable; and a motor 61, which is configured to rotate the axial-flow fan 100. The axial-flow fan 100 rotates about a rotation axis RS, thereby causing air to flow from the outside to the inside of the housing 51 and generating an airflow that is discharged from the inside of the housing 51 to the outside. The axial-flow fan 100 includes a hub 10 and a plurality of vanes 20. The hub 10 is connected to the rotary shaft, 62, of the motor 61. The vanes 20 are provided on the circumference of the hub 10.

The axial-flow fan 100 is connected to the motor 61 at the rotary shaft 62. The motor 61 is a drive source provided closer to the rear wall 51*d* than the axial-flow fan 100 and drives the axial-flow fan 100 to rotate. The motor 61 provides a driving force to the axial-flow fan 100. The motor 61 is attached to a motor support 69. The motor support 69 is located between the motor 61 and a heat exchanger 68.

When the axial-flow fan 100 rotates, air is taken into the outdoor unit 50 through the lateral face and the rear face of the housing 51 and passes through the heat exchanger 68, whereby heat is exchanged between the air passing through the heat exchanger 68 and refrigerant flowing inside the heat exchanger 68.

The inside of the housing 51 is divided by a partition 51*g*, which forms a wall, into a fan chamber 56 and a machine chamber 57. The axial-flow fan 100 is set in the fan chamber 56. The compressor 64 and other relevant devices are set in the machine chamber 57. The fan chamber 56 is a space enclosed by the lateral wall 51*a*, the partition 51*g*, the front wall 51*b*, the top plate 51*e*, and the bottom plate 51*f*. The machine chamber 57 is a space enclosed by the lateral wall 51*c*, the partition 51*g*, the front wall 51*b*, the rear wall 51*d*, the top plate 51*e*, and the bottom plate 51*f*. The lateral wall 51*a* is located across the axial-flow fan 100 from the partition 51*g*. The top plate 51*e* is located across the axial-flow fan 100 from the bottom plate 51*f*.

The heat exchanger 68 located at the inlet region of the axial-flow fan 100 in the housing 51 includes a plurality of fins arranged side by side such that the planar faces of the fins extend parallel to one another, and heat-transfer tubes extending through the fins in the direction in which the fins are arranged parallel to one another. The refrigerant that circulates through the refrigerant circuit 71 flows inside the heat-transfer tubes. In the heat exchanger 68, the plurality of heat-transfer tubes are arranged in the vertical direction and each have an L shape extending along the lateral wall 51*a* and the rear wall 51*d* of the housing 51.

The shape of the heat exchanger 68 is not limited to the above shape. For example, the heat exchanger 68 may have a substantially I shape extending along the inner rear face of the fan chamber 56 that is partially defined by the rear wall 51*d*. The heat exchanger 68 may alternatively be what is called a finless heat exchanger, which includes no fins through which heat-transfer tubes would extend. The heat exchanger 68 serves as the evaporator 73 in the heating operation and as the condenser 72 in the cooling operation.

The heat exchanger 68 of the outdoor unit 50 is connected to the compressor 64 by a pipe and any other relevant element and is further connected to an indoor heat exchanger (not illustrate), the expansion valve 74, and other relevant devices, whereby the refrigerant circuit 71 of the air-conditioning apparatus 70 is established. The heat exchanger 68 of the outdoor unit 50 serves as the condenser 72 or the evaporator 73 illustrated in FIG. 1. As illustrated in FIG. 4, the machine chamber 57 is provided with a board box 66, in which a control circuit board 67 is provided. The control circuit board 67 controls devices included in the outdoor unit 50.

As illustrated in FIGS. 3 and 5, the outdoor unit 50 includes a cylindrical bell mouth 63, which is provided in the fan chamber 56 of the housing 51 and is located radially outward in the axial-flow fan 100. The bell mouth 63 is located at the air outlet 53 and surrounds the outer circumference of the axial-flow fan 100. The bell mouth 63 surrounding the outer circumference of the axial-flow fan 100 rectifies the airflow generated by the axial-flow fan 100 and other relevant elements. The bell mouth 63 is located further outside than the outer circumferential ends of the vanes 20 and is annular in the rotating direction of the axial-flow fan 100. The bell mouth 63 is adjacent to the partition 51*g* at one lateral portion of the bell mouth 63 and is adjacent to a part of the lateral wall 51*a* of the housing 51 at the other lateral portion of the bell mouth 63.

In the axial direction of the rotation axis RS, one end of the bell mouth 63 is connected to the front wall 51*b* of the outdoor unit 50 in such a manner as to surround the circumference of the air outlet 53. The bell mouth 63 is, but not necessarily need to be, integrally formed on the front wall 51*b*. The bell mouth 63 may alternatively be prepared separately from the front wall 51*b* in such a manner as to be connected to the front wall 51*b*. In the outdoor unit 50 including the bell mouth 63, an air passage provided between the inlet region and the outlet region of the bell mouth 63 serves as an air duct in the vicinity of the air outlet 53. That is, the air duct in the vicinity of the air outlet 53 is separated from the other space in the fan chamber 56 by the bell mouth 63.

[Axial-Flow Fan 100]

Figure 6:
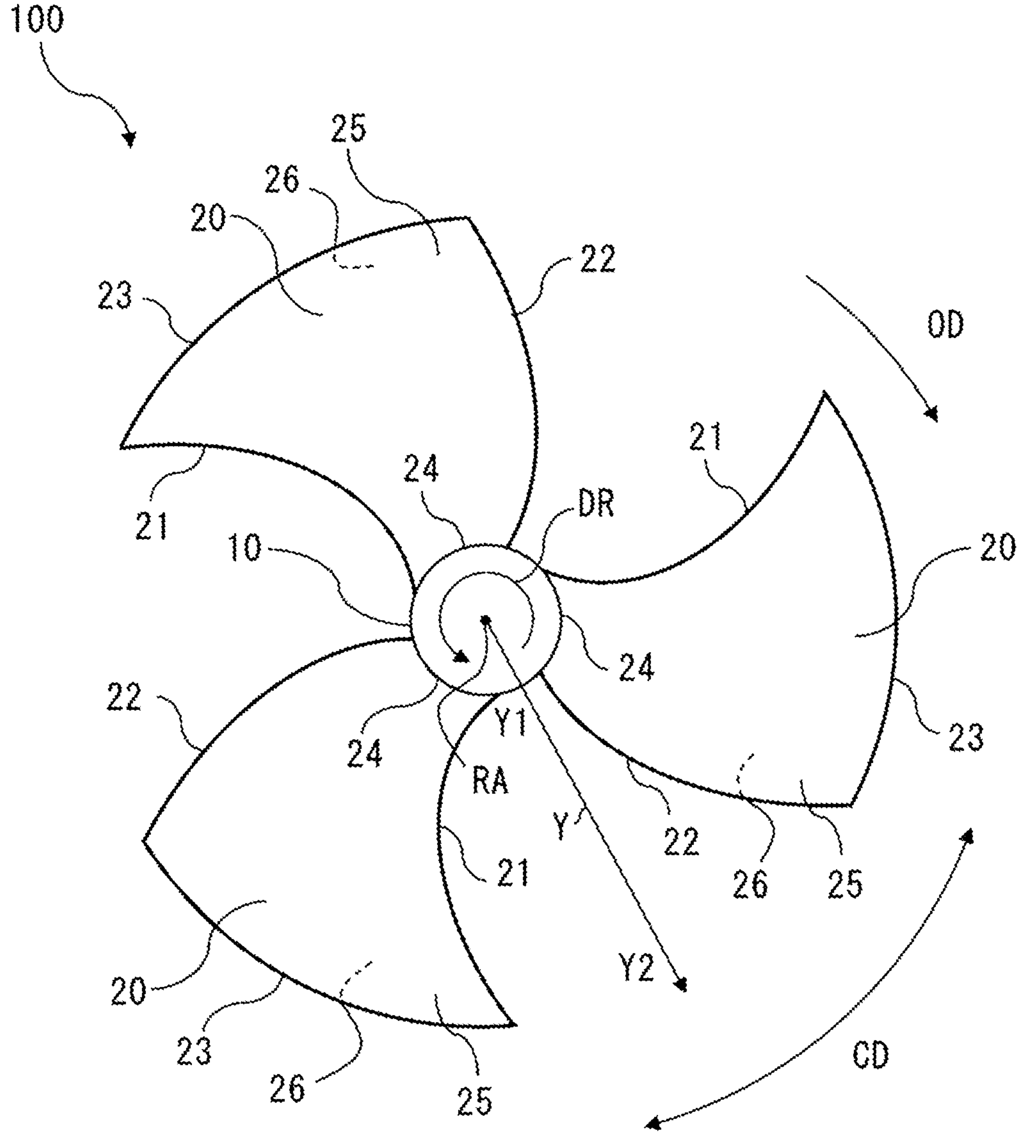
FIG. 6 is a schematic front view of an axial-flow fan according to Embodiment 1.

FIG. 6 is a schematic front view of the axial-flow fan 100 according to Embodiment 1. One of the arrows provided in FIG. 6 represents a rotating direction DR, in which the axial-flow fan 100 rotates. Another arrow provided in FIG. 6 represents an opposite rotating direction OD, which is a direction opposite to the direction in which the axial-flow fan 100 rotates. The double-headed arrow provided in FIG. 6 represents a circumferential direction CD, which represents the circumferential direction of the axial-flow fan 100. The circumferential direction CD includes the rotating direction DR and the opposite rotating direction OD.

With reference to FIG. 6, the axial-flow fan 100 according to Embodiment 1 will be described below. The axial-flow fan 100 is a device that generates a flow of fluid. As described above, the axial-flow fan 100 is to be included in the outdoor unit 50 intended for the air-conditioning apparatus 70. The axial-flow fan 100 rotates in the rotating direction DR about the rotation axis RA, thereby generating a flow of fluid. The fluid is, for example, a gas such as air.

A region further rear than the plane of the page of FIG. 6 is an upstream region of the axial-flow fan 100 in the direction of the flow of the fluid, and a region further front than the plane of the page of FIG. 6 is a downstream region of the axial-flow fan 100 in the direction of the flow of the fluid. The upstream region of the axial-flow fan 100 is the inlet region in which air is taken into the axial-flow fan 100, and the downstream region of the axial-flow fan 100 is the outlet region in which air is blown from the axial-flow fan 100.

As illustrated in FIG. 6, the axial-flow fan 100 includes the hub 10 located on the rotation axis RA, and the plurality of vanes 20 connected to the hub 10. The axial-flow fan 100 may be what is called a boss-less fan, in which the leading edge of one of each adjacent two of the plurality of vanes 20 is continuous with the trailing edge of the other with no boss.

(Hub 10)

The hub 10 is connected to the rotary shaft of a drive source such as a motor (not illustrated). The hub 10 may have, for example, a cylindrical shape or a plate shape. The shape of the hub 10 is not limited, as long as the hub 10 is connected to the rotary shaft of the drive source as described above.

The hub 10 is to be rotated by the motor (not illustrated) or any other drive source and defines the rotation axis RA. The hub 10 rotates about the rotation axis RA. The rotating direction DR of the axial-flow fan 100 is counterclockwise as represented by the arrow in FIG. 6. The rotating direction DR of the axial-flow fan 100 is not limited to the counterclockwise direction. The hub 10 may be configured to rotate clockwise by changing relevant factors such as the angle at which the vanes 20 are attached, or the orientation of the vanes 20.

(Vane 20)

The vanes 20 are provided on the circumference of the hub 10 and each extend in the radial direction from the hub 10 toward the outside. The plurality of vanes 20 are arranged in such a manner as to spread radially outward from the hub 10. The plurality of vanes 20 are spaced apart from one another in the circumferential direction CD. Embodiment 1 relates to an exemplary axial-flow fan 100 that includes three vanes 20. However, the number of vanes 20 is not limited to three.

Each vane 20 has a leading edge 21, a trailing edge 22, an outer circumferential edge 23, and an inner circumferential edge 24. The leading edge 21 forms an edge of the vane 20 that is located forward in the rotating direction DR. That is, the leading edge 21 is located further forward than the trailing edge 22 in the rotating direction DR. The leading edge 21 is located upstream of the trailing edge 22 in the direction of the flow of the fluid that is to be generated.

The trailing edge 22 forms an edge of the vane 20 that is located backward in the rotating direction DR. That is, the trailing edge 22 is located further backward than the leading edge 21 in the rotating direction DR. The trailing edge 22 is located downstream of the leading edge 21 in the direction of the flow of the fluid that is to be generated. In the axial-flow fan 100, the leading edge 21 forms a vane end that faces in the rotating direction DR of the axial-flow fan 100, and the trailing edge 22 forms a vane end located opposite the leading edge 21 in the rotating direction DR.

The outer circumferential edge 23 forms an edge at the outer circumference (Y2 side) of the vane 20. The outer circumferential edge 23 extends forward and backward in the rotating direction DR and connects the outermost circumferential point of the leading edge 21 and the outermost circumferential point of the trailing edge 22. The outer circumferential edge 23 forms an end of the axial-flow fan 100 that is at the outer circumference in the radial direction (Y-axis direction).

The outer circumferential edge 23 forms an arc when seen in a direction parallel to the rotation axis RA. The shape of the outer circumferential edge 23 is not limited to an arc when seen in the direction parallel to the rotation axis RA. When seen in the direction parallel to the rotation axis RA, the outer circumferential edge 23 is longer than the inner circumferential edge 24 in the circumferential direction CD. The relationship between the lengths of the outer circumferential edge 23 and the inner circumferential edge 24 in the circumferential direction CD is not limited to the above. The outer circumferential edge 23 and the inner circumferential edge 24 may have the same length, or the inner circumferential edge 24 may be longer than the outer circumferential edge 23.

The inner circumferential edge 24 forms an edge at the inner circumference (Y1 side), which is further inside than the outermost circumference of the vane 20. The inner circumferential edge 24 extends forward and backward in the rotating direction DR and connects the innermost circumferential point of the leading edge 21 and the innermost circumferential point of the trailing edge 22. The inner circumferential edge 24 forms an end of the axial-flow fan 100 that is at the inner circumference in the radial direction (Y-axis direction).

The inner circumferential edge 24 forms an arc when seen in the direction parallel to the rotation axis RA. The shape of the inner circumferential edge 24 is not limited to an arc when seen in the direction parallel to the rotation axis RA. The inner circumferential edge 24 of the vane 20 is connected to the hub 10 in any manner such as by being integrally formed on the hub 10. For example, the inner circumferential edge 24 of the vane 20 is integrally formed on the outer circumferential wall of the cylindrical hub 10.

The vanes 20 are each inclined to a plane perpendicular to the rotation axis RA. When the axial-flow fan 100 rotates, the vanes 20 deliver the fluid by pushing the fluid that is present between the vanes 20 at relevant surfaces of the vanes 20. One of the surfaces of each vane at which the fluid is pushed and therefore bears an increased pressure is referred to as a pressure surface 25, and a surface of each vane that is opposite the pressure surface 25 and at which the pressure decreases is referred to as a suction surface 26. In the direction of the flow of the fluid, the upstream surface of the vane 20 is the suction surface 26, and the downstream surface of the vane 20 is the pressure surface 25. In FIG. 6, one surface of the vane 20 that is further front than the other surface is the pressure surface 25, and the other surface of the vane 20, which is further rear than the one surface is the suction surface 26.

Figure 7:
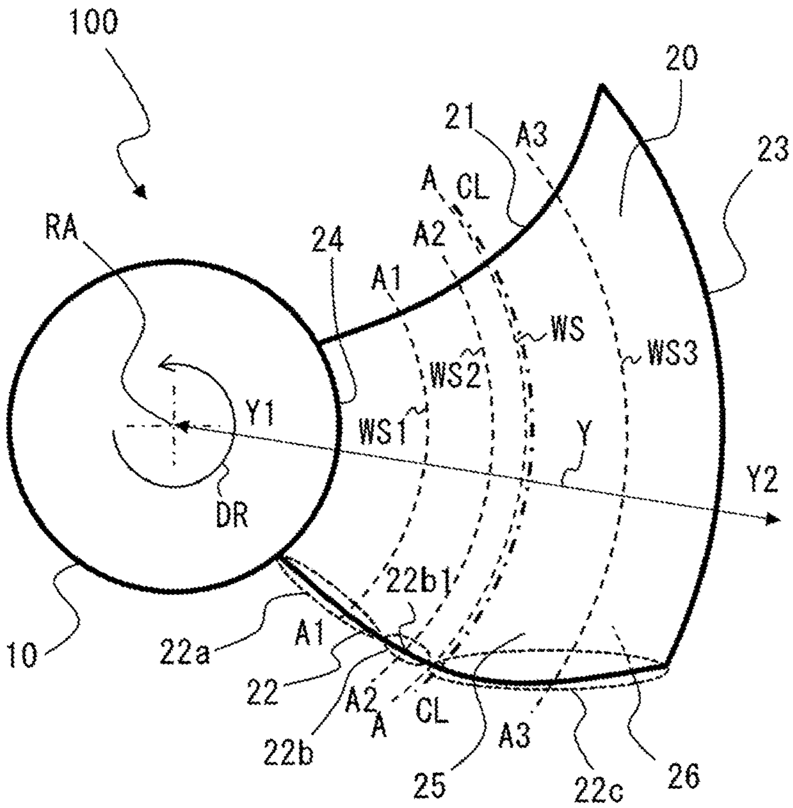
FIG. 7 is a schematic front view of a vane of the axial-flow fan according to Embodiment 1.
Figure 8:
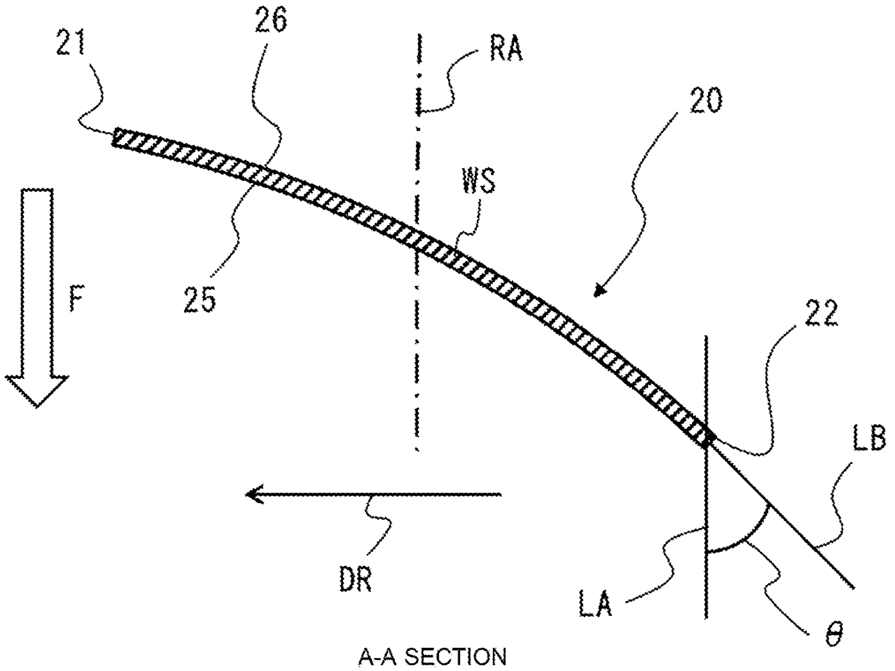
FIG. 8 illustrates a section of the vane illustrated in FIG. 7 that is taken along line A-A.

FIG. 7 is a schematic front view of the vane 20 of the axial-flow fan 100 according to Embodiment 1. FIG. 8 illustrates a section of the vane 20 illustrated in FIG. 7 that is taken along line A-A. FIG. 7 illustrates only one of the plurality of vanes 20 for describing the configuration of each vane 20 and does not illustrate the other vanes 20. The A-A section of the vane 20 illustrated in FIG. 8 is denoted as a vane section WS. The vane section WS is taken at a certain position in the radial direction about the rotation axis RS and along an arc passing through the leading edge 21 and the trailing edge 22. In FIG. 8, a white arrow F represents the direction of the airflow.

In the plan view of the vane 20 seen in the direction parallel to the axial direction of the rotation axis RS as illustrated in FIG. 7, the vane section WS forms an arc-shaped sectional part passing through the leading edge 21 and the trailing edge 22. The vane section WS illustrated in FIG. 8 is seen in the radial direction of the vane 20. That is, the vane section WS illustrated in FIG. 8 is a section of the vane 20 that is along the axial direction of the rotation axis RA and along the circumferential direction CD of the axial-flow fan 100.

As illustrated in FIG. 8, the vane 20 is concave at the pressure surface 25 and convex at the suction surface 26. In other words, the vane 20 is curved and warped in such a manner as to be convex in the direction opposite to the rotating direction DR of the axial-flow fan 100 and protrudes upstream of the airflow.

In the vane section WS illustrated in FIG. 8, an angle formed between a virtual line LA and a virtual line LB is defined as the outlet angle, θ, of the vane 20. The virtual line LA intersects the trailing edge 22 and is parallel to the rotation axis RA. The virtual line LB represents the direction in which the trailing edge 22 faces. In the vane section WS of the vane 20 illustrated in FIG. 8, the outlet angle θ between the virtual line LA and the virtual line LB is formed in an area downstream, in the airflow, of the virtual line LB and located backward in the rotating direction DR and backward of the virtual line LA. The outlet angle θ is 90 degrees or smaller.

Figure 9:
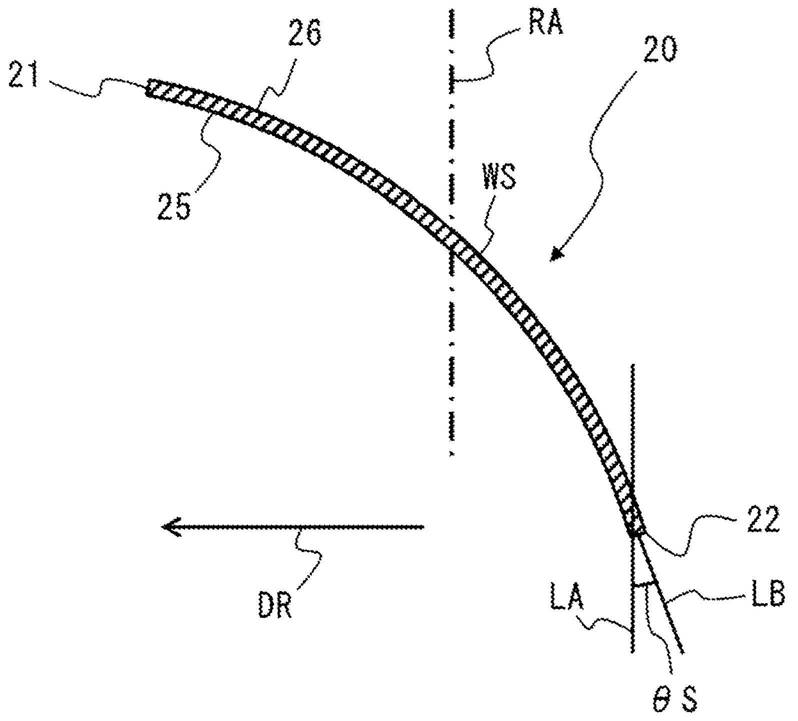
FIG. 9 illustrates a section, taken along line A-A, of a vane that forms an outlet angle θS.
Figure 10:
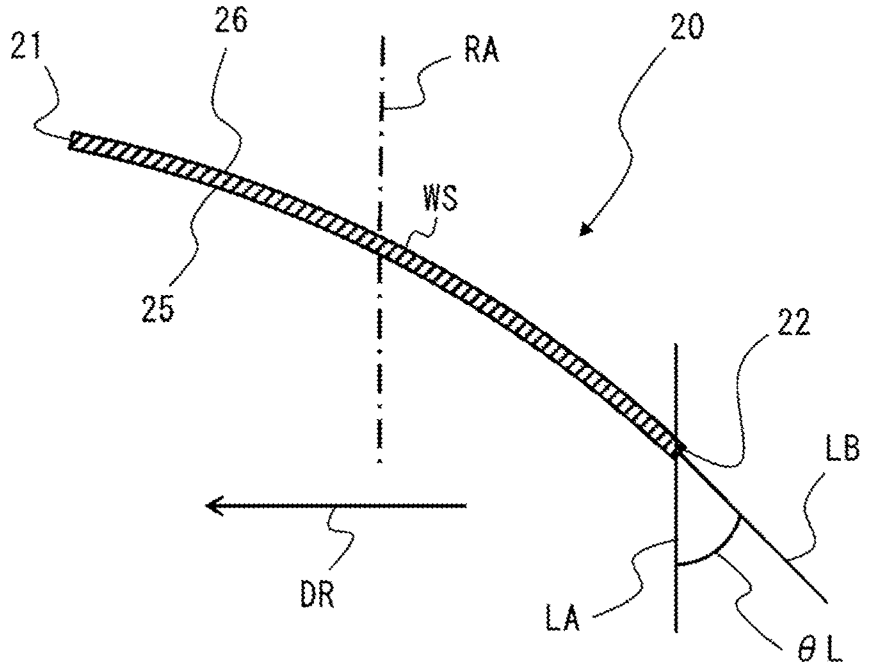
FIG. 10 illustrates a section, taken along line A-A, of a vane that forms an outlet angle θL.

FIG. 9 illustrates a section, taken along line A-A, of a vane 20 that forms an outlet angle θS. FIG. 10 illustrates a section, taken along line A-A, of a vane 20 that forms an outlet angle θL. With reference to FIGS. 9 and 10, the relationship between the outlet angle θ of the vane 20 and the vane load will be described below. The vane load refers to the pressure at which the vane 20 pushes air. The outlet angle θS is smaller than the outlet angle θL, and the outlet angle θL is greater than the outlet angle θS (outlet angle θS<outlet angle θL).

In the vane section WS of the vane 20 that forms the outlet angle θS, the pressure surface 25 of the vane 20 is more upright from the rotating direction DR, that is, the pressure surface 25 forms an angle more approximate to the right angle to the rotating direction DR, than in the vane section WS of the vane 20 that forms the outlet angle θL. This means that a part of the vane 20 that forms the outlet angle θS is to bear a greater vane load than a part of the vane 20 that forms the outlet angle θL.

In contrast, in the vane section WS of the vane 20 that forms the outlet angle θL, the pressure surface 25 of the vane 20 is more inclined toward the rotating direction DR, that is, the pressure surface 25 forms an angle more approximate to the parallel angle to the rotating direction DR, than in the vane section WS of the vane 20 that forms the outlet angle θS. This means that a part of the vane 20 that forms the outlet angle θL is to bear a smaller vane load than a part of the vane 20 that forms the outlet angle θS.

Figure 11:
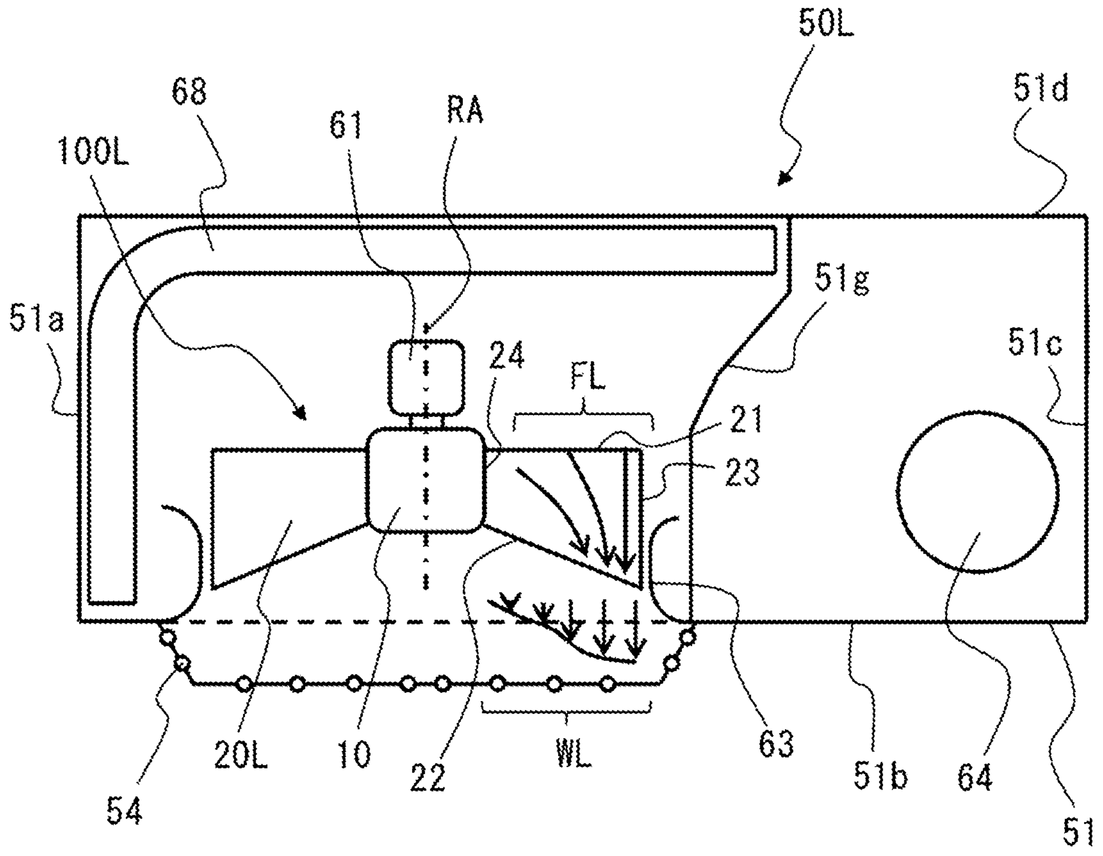
FIG. 11 is a conceptual top view of an outdoor unit including an axial-flow fan according to Comparative Example.
Figure 12:
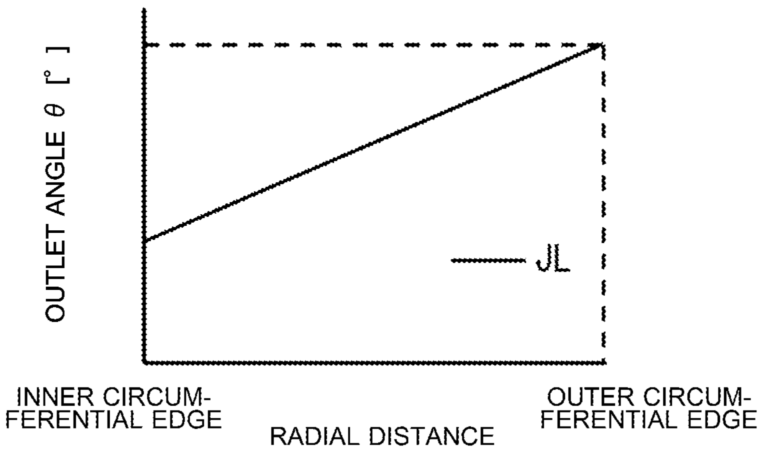
FIG. 12 illustrates the relationship between the radial distance and the size of the outlet angle θ in the axial-flow fan according to Comparative Example.

FIG. 11 is a conceptual top view of an outdoor unit 50L including an axial-flow fan 100L according to Comparative Example. FIG. 12 illustrates the relationship between the radial distance and the size of the outlet angle θ in the axial-flow fan 100L according to Comparative Example. In FIG. 11, the axial-flow fan 100 is illustrated as a revolved projection on a meridional plane containing the rotation axis RA and the vanes 20.

In FIG. 12, the horizontal axis represents the distance on the trailing edge 22 in the radial direction of the axial-flow fan 100L from the inner circumferential edge 24 to the outer circumferential edge 23, and the vertical axis represents the size of the outlet angle θ. Thus, FIG. 12 illustrates the relationship between the size of the outlet angle θ and the radial distance on the trailing edge 22 from the inner circumferential edge 24. The configuration of the vane 20L of the axial-flow fan 100L according to Comparative Example will be described below. The axial-flow fan 100L according to Comparative Example is a typical axial-flow fan employed in known arts.

In FIG. 12, a solid line JL represents the relationship between the distance on the trailing edge 22 of the axial-flow fan 100L from the inner circumferential edge 24 to the outer circumferential edge 23 and the size of the outlet angle θ. The vane 20L of the axial-flow fan 100L according to Comparative Example illustrated in FIG. 11 is shaped such that the outlet angle θ increases at a constant rate from the inner circumferential edge 24 to the outer circumferential edge 23. As illustrated in FIG. 12, the solid line JL represents a linear increase.

As illustrated in FIG. 11, the outdoor unit 50L typically includes, in the vicinity of the axial-flow fan 100L, elements such as a partition 51*g* that hinder the axial-flow fan 100 from taking in air. The elements such as the partition 51*g* include the partition 51*g* and any other components, such as a heat sink (not illustrated), projecting from the partition 51*g*.

The outdoor unit 50L according to Comparative Example exhibits the relationship illustrated in FIG. 12 between the radial distance and the size of the outlet angle θ. In the outdoor unit 50L including the vanes 20L each exhibiting the above relationship, since the elements including the partition 51*g* hinder the axial-flow fan 100L from taking in air as described above, the amount of air flowing from the lateral face of the axial-flow fan 100L is insufficient. Therefore, an amount of airflow FL in the outdoor unit 50L is increased that contains a radial component traveling on the vane surface from the inner circumference toward the outer circumference. Consequently, the vane load at the inner circumference of the axial-flow fan 100L is not satisfactorily increased relative to the vane load at the outer circumference of the axial-flow fan 100L. Thus, as illustrated in FIG. 11, the airflow FL on the vane surface of the axial-flow fan 100L travels toward the outer circumference under the influence of the elements including the partition 51*g*.

The air blown from the axial-flow fan 100L exhibits a wind-speed distribution WL in the radial direction in which points of highest wind speed concentratedly appear at or near the outermost circumference of the axial-flow fan 100L. In other words, the speed of the wind generated by the axial-flow fan 100L is lower at the inner circumference and higher at the outer circumference. Therefore, in the outdoor unit 50L according to Comparative Example, the airflow concentrated at or near the outermost circumference of the axial-flow fan 100L collides with structures including the fan grille that are located downstream of the outer circumference of the axial-flow fan 100L, thereby increasing the noise.

Figure 13:
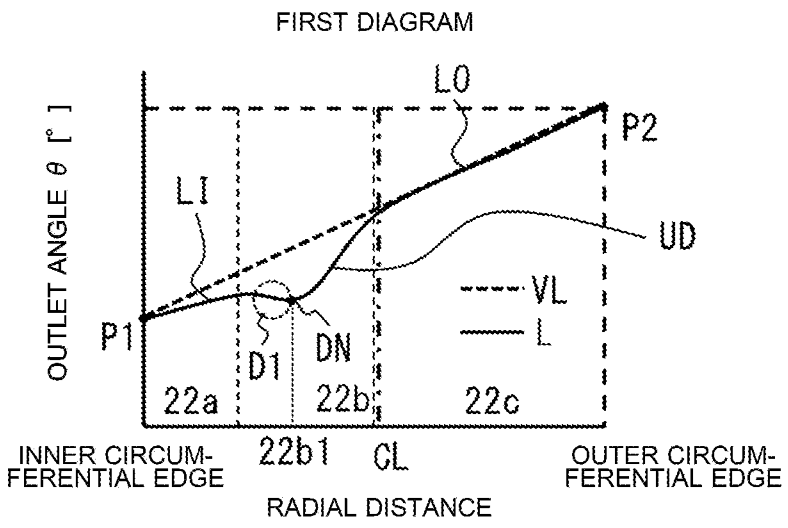
FIG. 13 illustrates the relationship between the radial distance and the size of the outlet angle θ in the axial-flow fan according to Embodiment 1.

FIG. 13 illustrates the relationship between the radial distance and the size of the outlet angle θ in the axial-flow fan 100 according to Embodiment 1. FIG. 13 is a first diagram in which the horizontal axis represents the distance on the trailing edge 22 in the radial direction of the axial-flow fan 100 from the inner circumferential edge 24 to the outer circumferential edge 23, and the vertical axis represents the size of the outlet angle θ. FIG. 13 illustrates, as a first line chart L, the relationship between the size of the outlet angle θ and the radial distance on the trailing edge 22 from the inner circumferential edge 24 in the axial-flow fan 100. With reference to FIG. 13, the vane 20 of the axial-flow fan 100 according to Embodiment 1 will further be described.

FIG. 13 provides a first virtual line chart VL, which is a linear virtual line connecting a point P1 and a point P2. The point P1 represents the size of the outlet angle θ formed at a point of the trailing edge 22 that is at the inner circumferential edge 24 in the axial-flow fan 100. The point P2 represents the size of the outlet angle θ formed at a point of the trailing edge 22 that is at the outer circumferential edge 23.

The point P1 representing the size of the outlet angle θ formed at a point of the trailing edge 22 that is at the inner circumferential edge 24 is the point at the innermost circumferential point of the trailing edge 22. The point P2 representing the size of the outlet angle θ formed at a point of the trailing edge 22 that is at the outer circumferential edge 23 is the point at the innermost circumferential point of the trailing edge 22. That is, the outlet angle θ at the point P1 is the outlet angle θ at the innermost circumferential point of the trailing edge 22. Furthermore, the outlet angle θ at the point P2 is the outlet angle θ at the outermost circumferential point of the trailing edge 22.

As with the case of the axial-flow fan 100L according to Comparative Example described above, the first virtual line chart VL has a linear shape representing that the outlet angle θ increases at a constant rate from the inner circumferential edge 24 to the outer circumferential edge 23.

As illustrated in FIG. 13, the first line chart L includes a downward convex portion UD, which is convex further downward than the first virtual line chart VL. The downward convex portion UD may include a region D1, where the outlet angle θ decreases from the region close to the inner circumferential edge 24 toward the region close to the outer circumferential edge 23. The downward convex portion UD may have a minimal possible point DN, where the outlet angle θ is minimal possible in the downward convex portion UD. The vane 20 having the minimal possible point DN is shaped such that, in the relationship between the outlet angle θ represented and the radial distance on the trailing edge 22 from the inner circumferential edge 24, the outlet angle θ is reduced at a halfway point in the radial distance to be smaller than the outlet angles 6 on the two respective points next to the halfway point. As illustrated in FIG. 7, the minimal possible point DN forms a peak 22*b*1 in a second region 22*b*. At the peak 22*b*1, the outlet angle θ is smallest in the second region 22*b* and the vane load to be borne is greatest in the second region 22*b*.

The downward convex portion UD is located closer to the inner circumference than the outer circumferential edge 23. It is further effective that the downward convex portion UD is located closer to the inner circumference than the center position, CL of the vane 20 in the radial direction of the axial-flow fan 100. The downward convex portion UD may be located at the center position CL of the vane 20.

Figure 14:
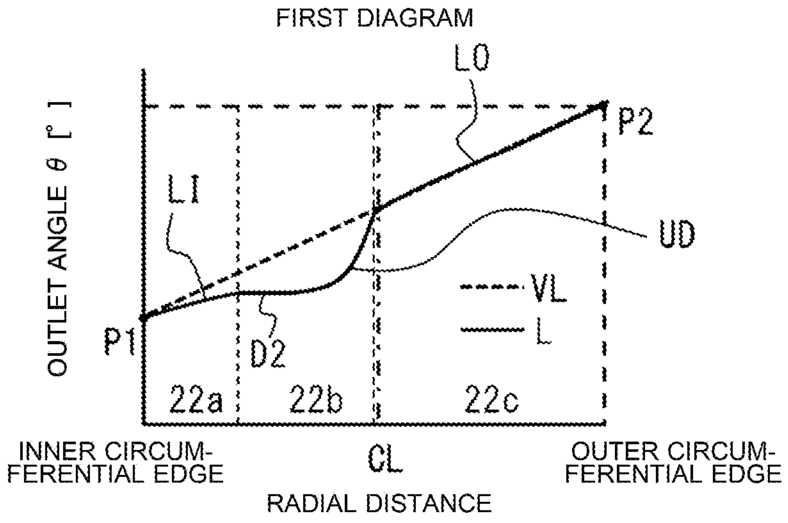
FIG. 14 illustrates the relationship between the radial distance and the size of the outlet angle θ in another example of the axial-flow fan according to Embodiment 1.

FIG. 14 illustrates the relationship between the radial distance and the size of the outlet angle θ in another example of the axial-flow fan 100 according to Embodiment 1. As with FIG. 13, FIG. 14 is a first diagram illustrating the relationship between the radial distance and the size of the outlet angle θ. As illustrated in FIG. 14, the downward convex portion UD may include a linear portion D2, where the outlet angle θ is constant from the region close to the inner circumferential edge 24 toward the region close to the outer circumferential edge 23.

The vane 20 of the axial-flow fan 100 includes, in the first line chart L, a first linear portion LI, which extends linearly between the inner circumferential edge 24 and the downward convex portion UD. The vane 20 of the axial-flow fan 100 further includes, in the first line chart L, a second linear portion LO, which extends linearly between the outer circumferential edge 23 and the downward convex portion UD.

The downward convex portion UD may include a linear portion that has a gentle inclination to the first linear portion LI and is continuous with the first linear portion LI. In other words, the downward convex portion UD may be shaped such that the above-described linear portion D2 illustrated in FIG. 14 has a gentle inclination to the first linear portion LI.

Here, a part of the trailing edge 22 that forms the first linear portion LI of the first line chart L is defined as a first region 22*a*, a part of the trailing edge 22 that forms the downward convex portion UD of the first line chart L is defined as the second region 22*b*, and a part that forms the second linear portion LO of the first line chart L is defined as a second region 22*b*. As illustrated in FIG. 7, the trailing edge 22 of the axial-flow fan 100 has the first region 22*a*, the second region 22*b*, and the third region 22*c* in that order from the inner circumference (Y1 side) toward the outer circumference (Y2 side).

Figure 15:
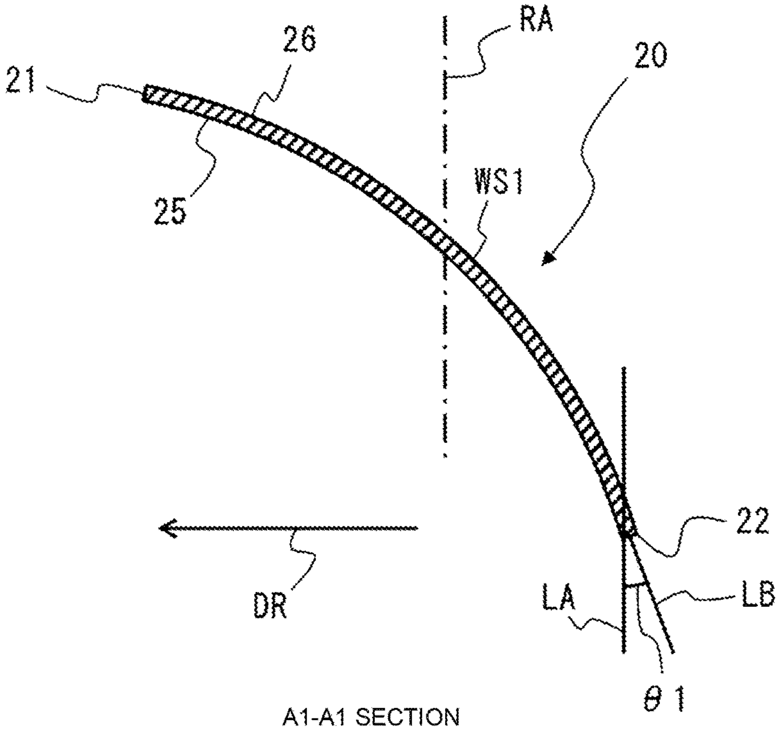
FIG. 15 illustrates a vane section, taken along line A1-A1, passing through a first region illustrated in FIG. 7.
Figure 16:
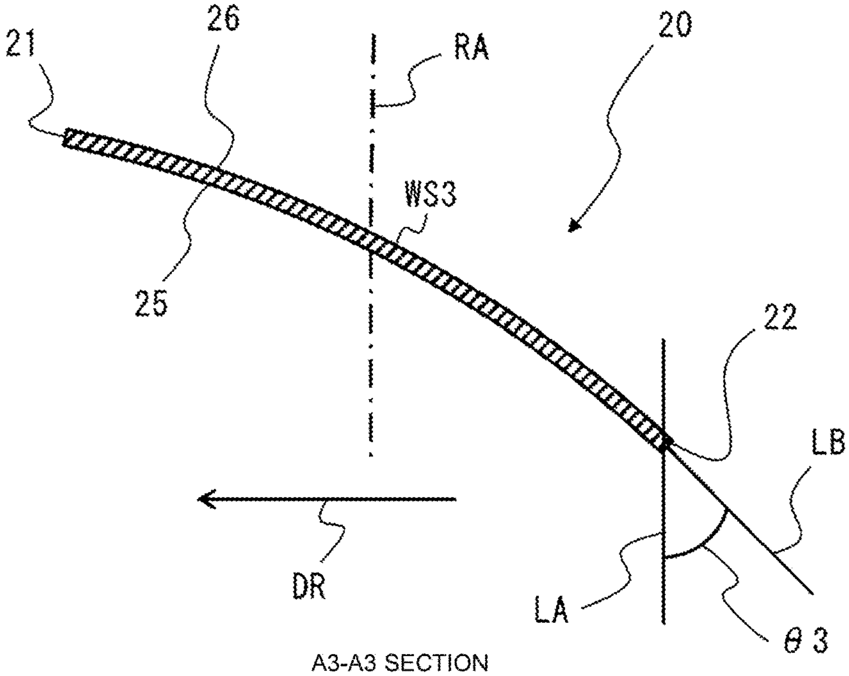
FIG. 16 illustrates a vane section, taken along line A3-A3, passing through a third region illustrated in FIG. 7.

FIG. 15 illustrates a vane section WS1, taken along line A1-A1, passing through the first region 22*a* illustrated in FIG. 7. FIG. 16 illustrates a vane section WS3, taken along line A3-A3, passing through the third region 22*c* illustrated in FIG. 7. The outlet angle, θ1, formed at the first region 22*a* is smaller than the outlet angle, θ3, formed at the third region 22*c*, and the outlet angle θ3 formed at the third region 22*c* is greater than the outlet angle θ1 formed at the first region 22*a* (outlet angle θ1<outlet angle θ3).

In the vane section WS1 of the vane 20 that forms the outlet angle θ1, the pressure surface 25 of the vane 20 is more upright from the rotating direction DR, that is, the pressure surface 25 forms an angle more approximate to the right angle to the rotating direction DR, than in the vane section WS3 of the vane 20 that forms the outlet angle θ3. This means that a part of the vane 20 that forms the outlet angle θ1 is to bear a greater vane load than a part of the vane 20 that forms the outlet angle θ3.

In contrast, in the vane section WS3 of the vane 20 that forms the outlet angle θ3, the pressure surface 25 of the vane 20 is more inclined toward the rotating direction DR, that is, the pressure surface 25 forms an angle more approximate to the parallel angle to the rotating direction DR, than in the vane section WS1 of the vane 20 that forms the outlet angle θ1. This means that a part of the vane 20 that forms the outlet angle θ3 is to bear a smaller vane load than a part of the vane 20 that forms the outlet angle θ1.

Accordingly, in view of the outlet angle θ, the axial-flow fan 100 is shaped such that the vane load to be borne is greater at a region that is divided by the downward convex portion UD and is close to the inner circumference than at a region that is divided by the downward convex portion UD and is close to the outer circumference. In other words, in the vane 20 as a whole, the axial-flow fan 100 is shaped such that the outlet angle θ formed at the trailing edge 22 is smaller at the region close to the inner circumferential edge 24 than at the region close to the outer circumferential edge 23.

Furthermore, in each of the first region 22*a* and the third region 22*c*, the axial-flow fan 100 is shaped such that the outlet angle θ increases from a region close to the inner circumference toward a region close to the outer circumference. More specifically, in the axial-flow fan 100, the first region 22*a* forms the outlet angle θS at the innermost of the first region 22*a*, and the outlet angle θL at the outermost of the first region 22*a*.

Likewise, in the axial-flow fan 100, the third region 22*c* forms the outlet angle θS at the innermost of the third region 22*c* and the outlet angle θL at the outermost of the third region 22*c*. Furthermore, in the axial-flow fan 100 as a whole, the first region 22*a* located at the inner circumference of the axial-flow fan 100 forms the outlet angle θS, while the third region 22*c* located at the outer circumference of the axial-flow fan 100 forms the outlet angle θL.

Figure 17:
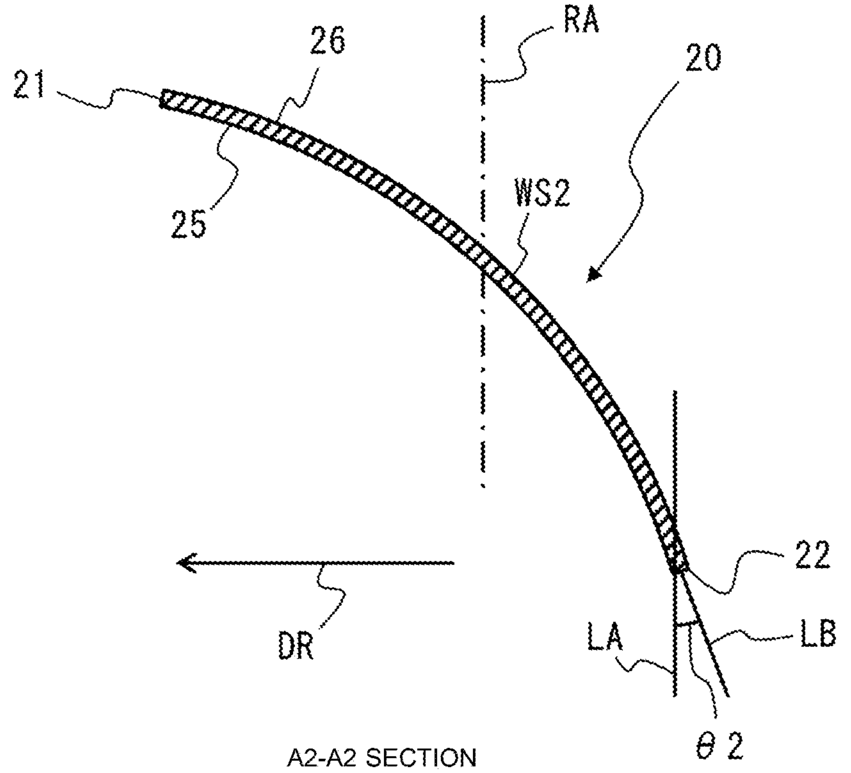
FIG. 17 illustrates a vane section, taken along line A2-A2, passing through a second region illustrated in FIG. 7.

FIG. 17 illustrates a vane section WS2, taken along line A2-A2, passing through the second region 22*b* illustrated in FIG. 7. The outlet angle, θ2, formed at the second region 22*b* is smaller than the outlet angle θ3 formed at the third region 22*c*, and the outlet angle θ3 formed at the third region 22*c* is greater than the outlet angle θ2 formed at the second region 22*b* (outlet angle θ2<outlet angle θ3).

In the vane section WS2 of the vane 20 that forms the outlet angle θ2, the pressure surface 25 of the vane 20 is more upright from the rotating direction DR, that is, the pressure surface 25 forms an angle more approximate to the right angle to the rotating direction DR, than in the vane section WS3 of the vane 20 that forms the outlet angle θ3. This means that a part of the vane 20 that forms the outlet angle θ2 is to bear a greater vane load than a part of the vane 20 that forms the outlet angle θ3.

In contrast, in the vane section WS3 of the vane 20 that forms the outlet angle θ3, the pressure surface 25 of the vane 20 is more inclined toward the rotating direction DR, that is, the pressure surface 25 forms an angle more approximate to the parallel angle to the rotating direction DR, than in the vane section WS2 of the vane 20 that forms the outlet angle θ2. This means that a part of the vane 20 that forms the outlet angle θ3 is to bear a smaller vane load than a part of the vane 20 that forms the outlet angle θ2.

The outlet angle θ2 formed at the second region 22*b* includes a part that is equal to or smaller than the outlet angle θ1 formed at the first region 22*a* (outlet angle θ2≤outlet angle θ1).

Here, a case where the outlet angle θ2 formed at the second region 22*b* of the vane 20 is smaller than the outlet angle θ1 formed at the first region 22*a* will be discussed. In the vane section WS2 of the vane 20 that forms the outlet angle θ2, the pressure surface 25 of the vane 20 is more upright from the rotating direction DR, that is, the pressure surface 25 forms an angle more approximate to the right angle to the rotating direction DR, than in the vane section WS1 of the vane 20 that forms the outlet angle θ1. This means that a part of the vane 20 where the outlet angle θ2 formed at the second region 22*b* is smaller than the outlet angle θ1 formed at the first region 22*a* is to bear a greater vane load than a part of the vane 20 where the outlet angle θ1 is formed in the foregoing part.

Furthermore, as described above, the outlet angle θ2 formed at the second region 22*b* includes a part that is equal to or smaller than the outlet angle θ1 formed at the first region 22*a* (outlet angle θ2≤outlet angle θ1). In this part, the pressure surface 25 of the vane 20 is more upright, that is, the pressure surface 25 forms an angle more approximate to the right angle to the rotating direction DR, than in the vane 20L that forms the first virtual line chart VL. Therefore, when the outlet angle θ2 formed at the second region 22*b* includes a part that is equal to or smaller than the outlet angle θ1 formed at the first region 22*a*, that is, when the downward convex portion UD is provided, the vane 20 including such a region is to bear a greater vane load than the vane 20L that forms the first virtual line chart VL.

[Operational Effects of Axial-Flow Fan 100 and Outdoor Unit 50]

Figure 18:
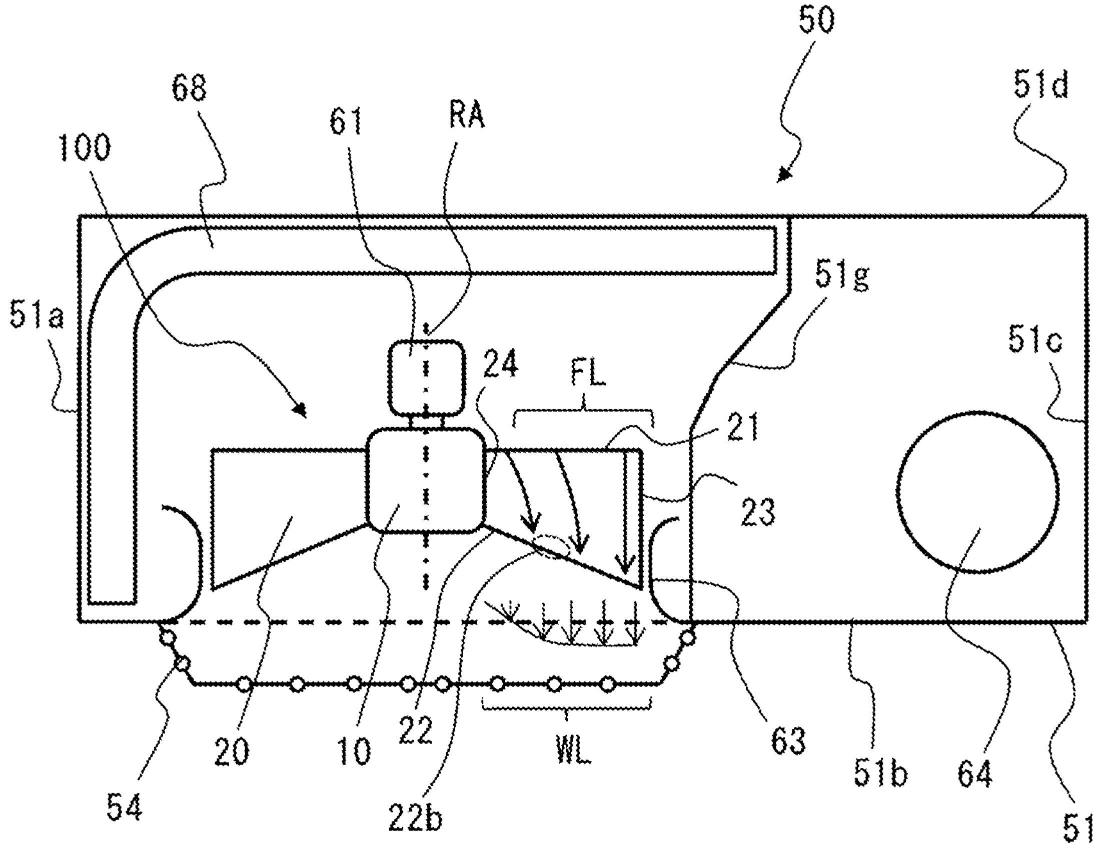
FIG. 18 is a conceptual top view of the outdoor unit including the axial-flow fan according to Embodiment 1.

FIG. 18 is a conceptual top view of the outdoor unit 50 including the axial-flow fan 100 according to Embodiment 1. In FIG. 18, the axial-flow fan 100 is illustrated as a revolved projection on a meridional plane containing the rotation axis RA and the vanes 20. As described above for the outdoor unit 50L according to Comparative Example with reference to FIG. 11, the outdoor unit 50L typically includes elements such as the partition 51*g* that hinder the axial-flow fan 100L from taking in air. Therefore, an amount of airflow FL is increased that contains a radial component traveling on the vane surface from the inner circumference toward the outer circumference.

In the outdoor unit 50L according to Comparative Example, such a vane load is not adjusted in the radial direction of the axial-flow fan 100L. Consequently, the vane load borne at the inner circumference of the axial-flow fan 100L is not satisfactorily increased relative to the vane load at the outer circumference of the axial-flow fan 100L. Therefore, in the outdoor unit 50L according to Comparative Example, the airflow concentrated at or near the outermost circumference of the axial-flow fan 100L collides with structures including the fan grille that are located downstream of the outer circumference of the axial-flow fan 100L, thereby increasing the noise.

In view of the above, the axial-flow fan 100 according to Embodiment 1 includes the vanes 20 each shaped such that the first line chart L includes the downward convex portion UD that is convex further downward than the first virtual line chart VL. When the downward convex portion UD is provided, the vane 20 having such a region includes a part where the outlet angle θ formed at the vane 20 is smaller, with the presence of the downward convex portion UD, than in the vane 20L that forms the first virtual line chart VL. Accordingly, the vane load to be borne is increased at the part forming the downward convex portion UD.

Therefore, in the axial-flow fan 100, the vane load to be borne at the inner circumference is increased satisfactorily relative to the vane load to be borne at the outer circumference, whereby the airflow on the vane surface is induced toward the inner circumference. Thus, the air blown from the axial-flow fan 100 produces a wind-speed distribution that is even in the radial direction. Consequently, the axial-flow fan 100 that is set in the outdoor unit 50 generates reduced noise that tends to occur at the collision with structures including the fan grille that are located downstream of the axial-flow fan 100. Furthermore, in the outdoor unit 50, the even wind-speed distribution of the air blown from the axial-flow fan 100 reduces the resistance caused by the collision with the fan grille 54. Accordingly, the load to be borne by the axial-flow fan 100 of the outdoor unit 50 is reduced, and the fan input is reduced.

The downward convex portion UD is located closer to the inner circumference than the center position CL of the vane 20 in the radial direction of the axial-flow fan 100. With the downward convex portion UD located at such a position, the airflow on the vane surface is induced toward the inner circumference even when the airflow on the vane surface significantly gather toward the outer circumference. Therefore, the air blown from the axial-flow fan 100 produces a wind-speed distribution that is even in the radial direction.

The vane 20 further includes, in the first line chart L, the first linear portion LI that extends linearly between the inner circumferential edge 24 and the downward convex portion UD. The vane 20 further includes, in the first line chart L, the second linear portion LO that extends linearly between the outer circumferential edge 23 and the downward convex portion UD. The presence of such portions in the vane 20 make the vane load different between that borne by the downward convex portion UD and that borne by the first linear portion LI or the second linear portion LO.

Furthermore, the downward convex portion UD includes a linear portion D2 that has a gentle inclination to the first linear portion LI and that is continuous with the first linear portion LI. The vane 20 including such a portion has the minimal possible point DN, thereby including a part where the outlet angle θ of the vane 20 is smaller than in the vane 20L forming the first virtual line chart VL. In such a configuration, the vane load increases particularly at the peak **22*b*1 of the vane 20** where the minimal possible point DN is defined.

Therefore, in the axial-flow fan 100, the vane load to be borne at the inner circumference is increased satisfactorily relative to the vane load to be borne at the outer circumference, whereby the airflow on the vane surface is induced toward the inner circumference. Thus, the air blown from the axial-flow fan 100 produces a wind-speed distribution that is even in the radial direction. Consequently, the axial-flow fan 100 that is set in the outdoor unit 50 generates reduced noise that tends to occur at the collision with structures including the fan grille that are located downstream of the axial-flow fan 100. Furthermore, as described above, the fan input is reduced.

The downward convex portion UD has the minimal possible point DN where the outlet angle θ is minimal possible. The vane 20 having the minimal possible point DN includes a part where the outlet angle θ is smaller than in the vane 20L forming the first virtual line chart VL. In such a configuration, the vane load increases particularly in the vane 20 having the minimal possible point DN and at the peak **22*b*1**.

Therefore, in the axial-flow fan 100, the vane load to be borne at the inner circumference is increased satisfactorily relative to the vane load to be borne at the outer circumference, whereby the airflow on the vane surface is induced toward the inner circumference. Thus, the air blown from the axial-flow fan 100 produces a wind-speed distribution that is even in the radial direction. Consequently, the axial-flow fan 100 that is set in the outdoor unit 50 generates reduced noise that tends to occur at the collision with structures including the fan grille that are located downstream of the axial-flow fan 100. Furthermore, as described above, the fan input is reduced.

The outdoor unit 50 of the air-conditioning apparatus 70 includes the axial-flow fan 100 and therefore exerts the above advantageous effects of the axial-flow fan 100.

Embodiment 2

Figure 19:
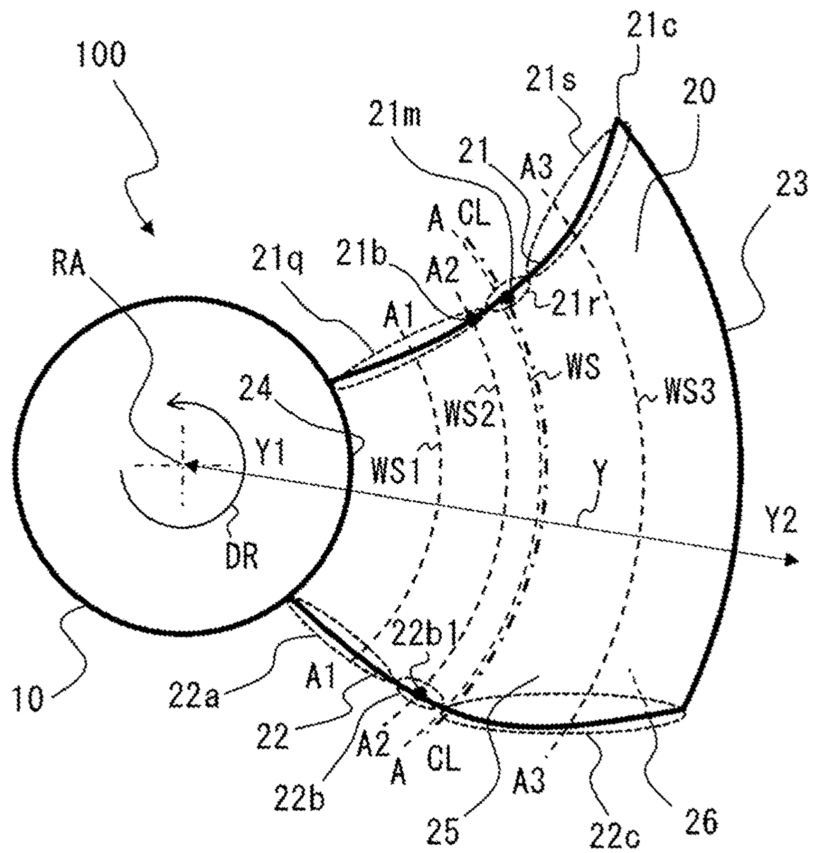
FIG. 19 is a schematic front view of a vane of an axial-flow fan according to Embodiment 2.
Figure 20:
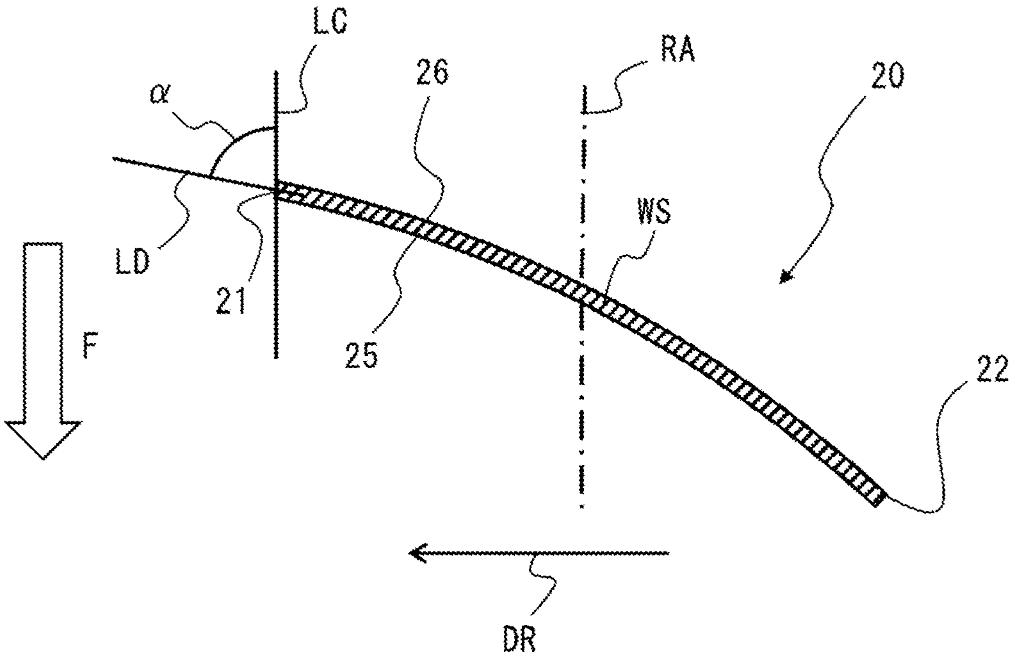
FIG. 20 illustrates a section of the vane illustrated in FIGS. 7 and 19 that is taken along line A-A.

FIG. 19 is a schematic front view of a vane 20 of an axial-flow fan 100 according to Embodiment 2. FIG. 20 illustrates a section of the vane 20 illustrated in FIGS. 7 and 19 that is taken along line A-A. FIG. 19 illustrates only one of a plurality of vanes 20 for describing the configuration of each vane 20 and does not illustrate the other vanes 20. In FIG. 20, a white arrow F represents the direction of the airflow. Elements that have the same configurations as those of the axial-flow fan 100 and the outdoor unit 50 illustrated in FIGS. 1 to 18 are denoted by corresponding ones of the reference signs, and the description of such elements is omitted. The axial-flow fan 100 according to Embodiment 2 will be described for specifying details of the inlet angle, a, of the vane 20 described below.

In the vane section WS illustrated in FIG. 20, an angle formed between a virtual line LC and a virtual line LD is defined as the inlet angle α of the vane 20. The virtual line LC intersects the leading edge 21 and is parallel to the rotation axis RA. The virtual line LD represents the direction in which the leading edge 21 faces. In the vane section WS of the vane 20 illustrated in FIG. 20, the inlet angle α between the virtual line LC and the virtual line LD is formed in an area upstream, of the airflow, of the virtual line LD and located further forward in the rotating direction DR to the virtual line LC. The inlet angle α is 90 degrees or smaller.

Figure 21:
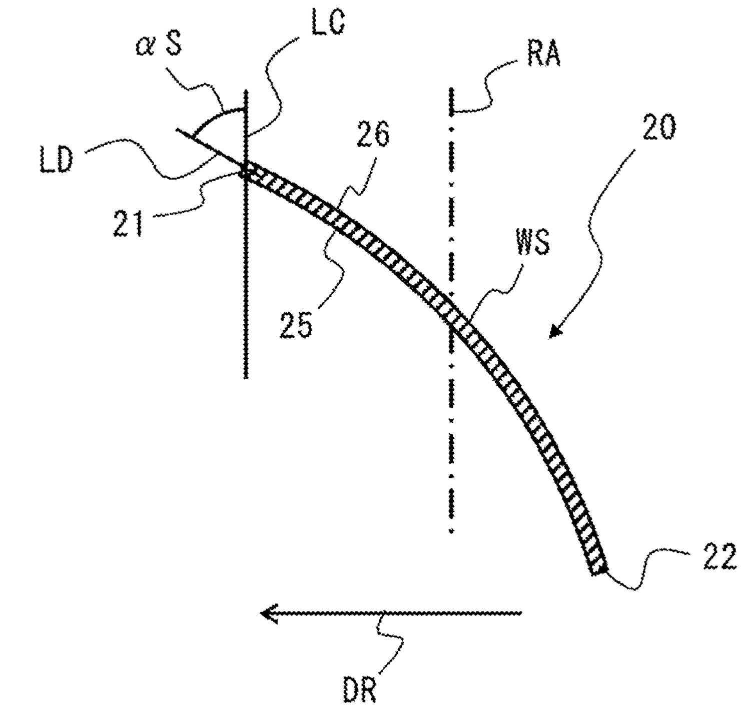
FIG. 21 illustrates a section, taken along line A-A, of a vane that forms an inlet angle αS.
Figure 22:
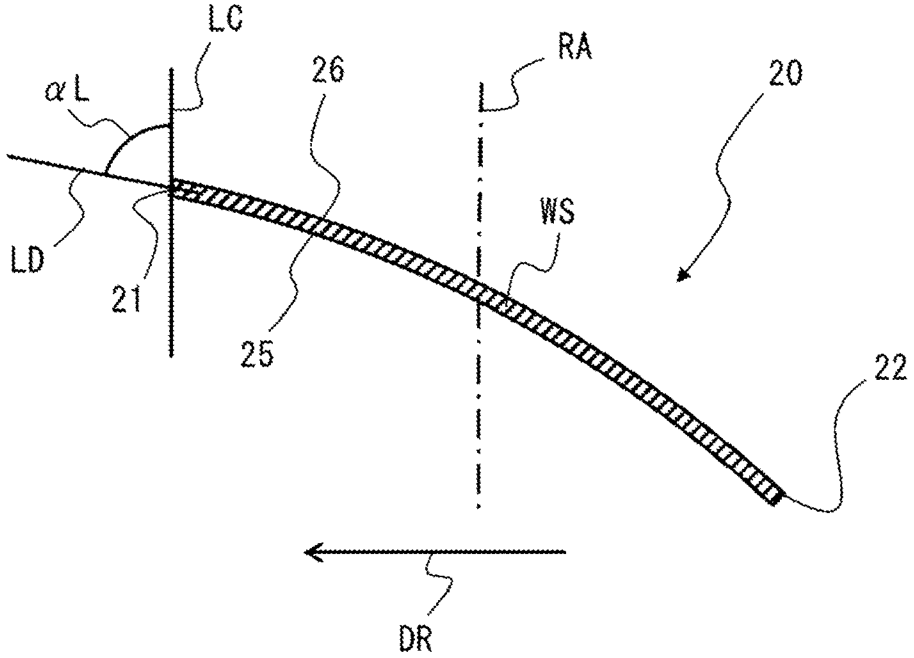
FIG. 22 illustrates a section, taken along line A-A, of a vane that forms an inlet angle αL.

FIG. 21 illustrates a section, taken along line A-A, of a vane 20 that forms an inlet angle αS. FIG. 22 illustrates a section, taken along line A-A, of a vane 20 that forms an inlet angle αL. With reference to FIGS. 21 and 22, the relationship between the inlet angle α of the vane 20 and the vane load will be described below. The inlet angle αS is smaller than the inlet angle αL, and the inlet angle αL is greater than the inlet angle αS (inlet angle αS<inlet angle αL).

In the vane section WS of the vane 20 that forms the inlet angle αS, the pressure surface 25 of the vane 20 is more upright from the rotating direction DR, that is, the pressure surface 25 forms an angle more approximate to the right angle to the rotating direction DR, than in the vane section WS of the vane 20 that forms the inlet angle αL. This means that a part of the vane 20 that forms the inlet angle αS is to bear a greater vane load than a part of the vane 20 that forms the inlet angle αL.

In contrast, in the vane section WS of the vane 20 that forms the inlet angle αL, the pressure surface 25 of the vane 20 is more inclined toward the rotating direction DR, that is, the pressure surface 25 forms an angle more approximate to the parallel angle to the rotating direction DR, than in the vane section WS of the vane 20 that forms the inlet angle αS. This means that a part of the vane 20 that forms the inlet angle αL is to bear a smaller vane load than a part of the vane 20 that forms the inlet angle αS.

Figure 23:
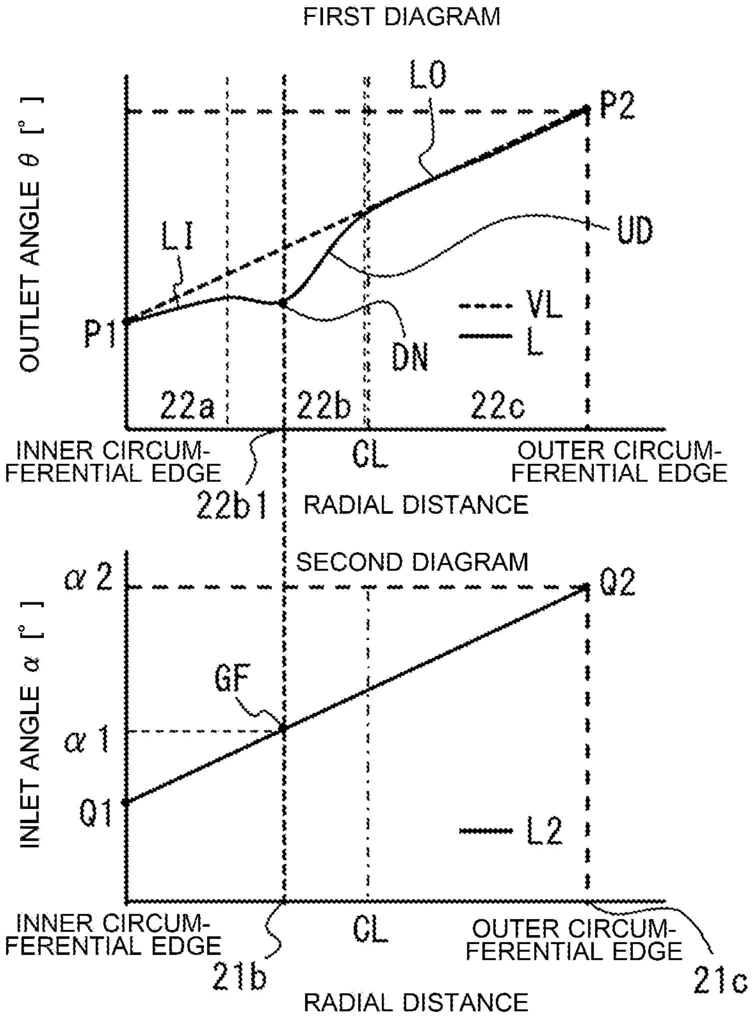
FIG. 23 illustrates the relationship established in the vane that is represented by a first diagram and a second diagram.

FIG. 23 illustrates the relationship established in the vane 20 that is represented by a first diagram and a second diagram. In FIG. 23, the upper diagram is the first diagram described above, and the lower diagram is the second diagram to be described below. In the second diagram, the horizontal axis represents the distance on the leading edge 21 in the radial direction of the axial-flow fan 100 from the inner circumferential edge 24 to the outer circumferential edge 23, and the vertical axis represents the size of the inlet angle α. The second diagram illustrates, as a second line chart L2, the relationship between the size of the inlet angle α and the radial distance on the leading edge 21 from the inner circumferential edge 24 in the axial-flow fan 100.

The second line chart L2 is a linear line connecting a point Q1 and a point Q2. The point Q1 represents the size of the inlet angle α formed at a point of the leading edge 21 of the axial-flow fan 100 that is at the inner circumferential edge 24. The point Q2 represents the size of the inlet angle α formed at a point of the leading edge 21 that is at the outer circumferential edge 23. The second virtual line chart VL2 has a linear shape representing that the inlet angle α formed at the leading edge 21 increases at a constant rate from the inner circumferential edge 24 to the outer circumferential edge 23.

The point Q1 representing the size of the inlet angle α formed at a point of the leading edge 21 that is at the inner circumferential edge 24 is the point at the innermost circumferential point of the leading edge 21. The point Q2 representing the size of the inlet angle α formed at a point of the leading edge 21 that is at the outer circumferential edge 23 is the point at the innermost circumferential point of the leading edge 21. That is, the inlet angle α at the point Q1 is the inlet angle α at the innermost circumferential point of the leading edge 21. Furthermore, the inlet angle α at the point Q2 is the inlet angle α at the outermost circumferential point of the leading edge 21.

With reference to FIG. 23, the first diagram and the second diagram will be compared below with each other. When the first diagram and the second diagram are compared with each other, a point GF is defined in the second line chart L2 at a distance equal to the radial distance of the minimal possible point DN of the outlet angle θ represented in the first line chart L. An inlet angle α1 is formed at the point GF and is smaller than an inlet angle α2, which is formed at a point of the leading edge 21 that is at the outer circumferential edge 23. As illustrated in FIG. 19, a part of the leading edge 21 that forms the point GF is referred to as a leading-edge load-bearing point 21*b*.

[Operational Effects of Axial-Flow Fan 100 and Outdoor Unit 50]

Figure 24:
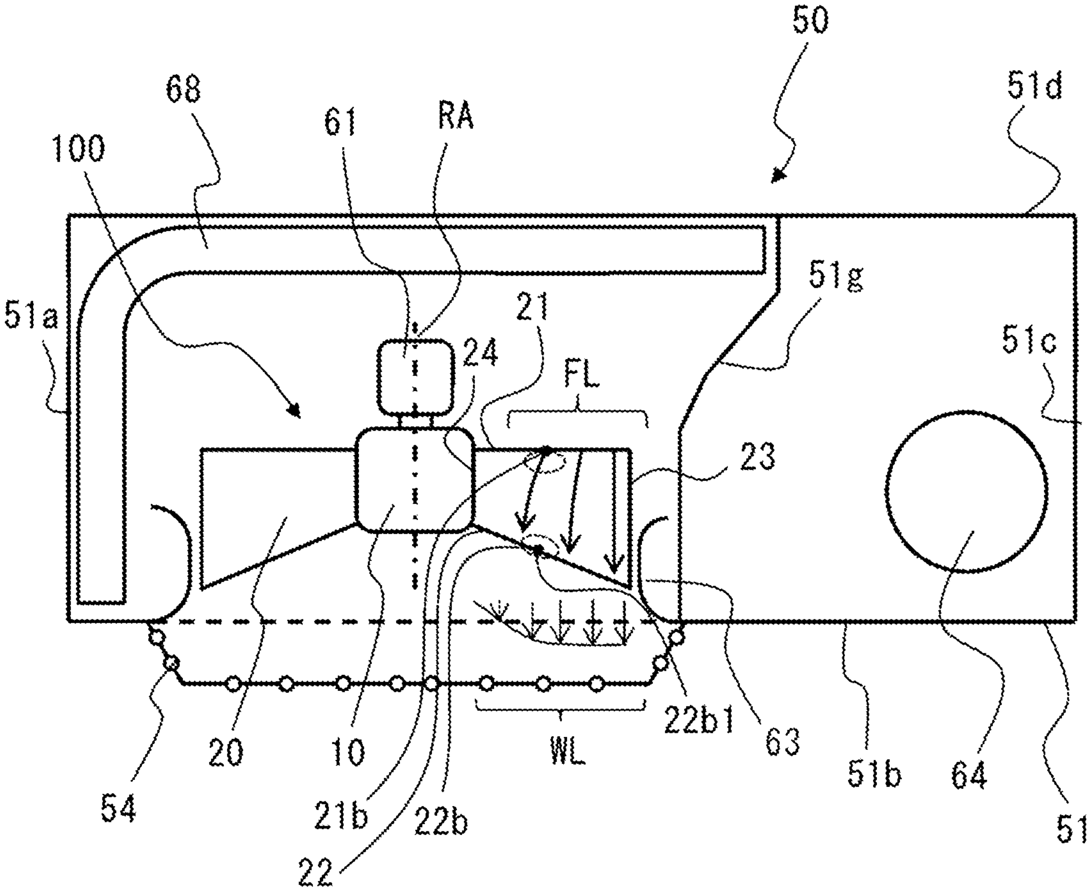
FIG. 24 is a conceptual top view of an outdoor unit including the axial-flow fan according to Embodiment 2.

FIG. 24 is a conceptual top view of an outdoor unit 50 including the axial-flow fan 100 according to Embodiment 2. In FIG. 24, the axial-flow fan 100 is illustrated as a revolved projection on a meridional plane containing the rotation axis RA and the vanes 20.

The axial-flow fan 100 includes vanes 20 in each of which the inlet angle α at the point GF in the second diagram that is at the same distance as the radial distance of the minimal possible point DN of the outlet angle θ represented in the first diagram is smaller than the inlet angle α formed at a point of the leading edge 21 that is at the outer circumferential edge 23. Therefore, the vane 20 is shaped such that the vane load to be borne by the leading-edge load-bearing point 21*b* forming the point GF is greater than the vane load to be borne at a point of the leading edge 21 that is at the outer circumferential edge 23.

In the axial-flow fan 100 configured as above, the vane load to be borne on the leading edge of the vane 20 is increased satisfactorily at the radial position of the peak 22*b*1, which forms the minimal possible point DN, relative to the vane load to be borne at the outer circumference. Therefore, in the axial-flow fan 100, compared with the case of the axial-flow fan 100 according to Embodiment 1, more airflow is induced toward the second region 22*b* where the trailing edge 22 has the minimal possible point DN, and the air blown from the axial-flow fan 100 therefore produces a wind-speed distribution WL that is more even in the radial direction.

Consequently, the axial-flow fan 100 that is set in the outdoor unit 50 generates reduced noise that tends to occur at the collision with structures including the fan grille that are located downstream of the axial-flow fan 100. Furthermore, as described above, the fan input is reduced. As described above, the minimal possible point DN is a point on the trailing edge 22 of the vane 20 and where the outlet angle θ is minimal possible.

The outdoor unit 50 for the air-conditioning apparatus 70 according to Embodiment 2 includes the axial-flow fan 100 and therefore exerts the above advantageous effects of the axial-flow fan 100.

Embodiment 3

Figure 25:
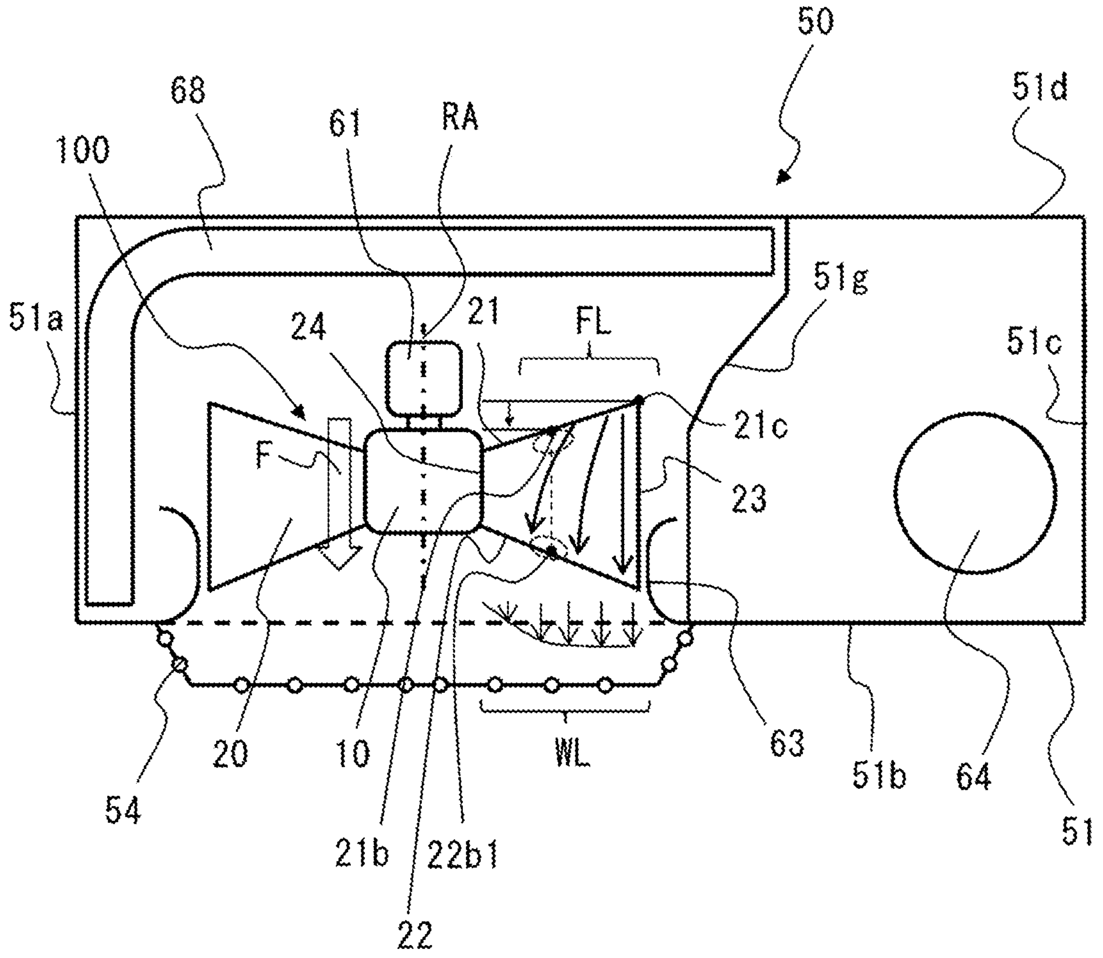
FIG. 25 is a conceptual top view of an outdoor unit including an axial-flow fan according to Embodiment 3.

FIG. 25 is a conceptual top view of an outdoor unit 50 including an axial-flow fan 100 according to Embodiment 3. In FIG. 25, the axial-flow fan 100 is illustrated as a revolved projection on a meridional plane containing the rotation axis RA and the vanes 20. Elements that have the same configurations as those of the axial-flow fan 100 and the outdoor unit 50 illustrated in any of FIGS. 1 to 24 are denoted by corresponding ones of the reference signs, and the description of such elements is omitted. The axial-flow fan 100 according to Embodiment 3 will be described for specifying the position of the leading-edge load-bearing point 21*b* that forms the point GF. With reference to FIGS. 19 to 25, the axial-flow fan 100 according to Embodiment 3 will be described below.

A direction along the axial direction of the rotation axis RA and oriented from the leading edge 21 toward the trailing edge 22 is defined as the direction of the airflow. In FIG. 25, a white arrow F represents the direction of the airflow. In FIG. 23, a part of the leading edge 21 that forms the inlet angle at the point GF in the second line chart L2 at a distance equal to the radial distance of the minimal possible point DN of the outlet angle θ represented in the first line chart L is defined as the leading-edge load-bearing point 21*b*.

Furthermore, as illustrated in FIGS. 23 and 25, a point of the leading edge 21 that is at the outer circumferential edge 23 is defined as a leading-edge outer circumferential point 21*c*. As illustrated in FIG. 25, the leading-edge load-bearing point 21*b* is located downstream of the leading-edge outer circumferential point 21*c* in the direction of the airflow.

[Operational Effects of Axial-Flow Fan 100 and Outdoor Unit 50]

Airflow is affected by the viscosity of the vane surface. Therefore, when the position of the leading edge 21 in the axial direction varies in the radial direction, air tends to flow toward a more downstream part of the leading edge 21. In this respect, since the leading-edge load-bearing point 21*b* is defined downstream of the leading-edge outer circumferential point 21*c* in the direction of the airflow, the axial-flow fan 100 exerts the viscosity of the vane surface and thus induces the airflow toward a radial position of the trailing edge 22 that is in the second region 22*b*. Consequently, in the axial-flow fan 100, compared with the case of the axial-flow fan 100 according to Embodiment 1, more airflow is induced toward the second region 22*b* where the trailing edge 22 has the minimal possible point DN, and the air blown from the axial-flow fan 100 therefore produces a wind-speed distribution WL that is more even in the radial direction.

The outdoor unit 50 for the air-conditioning apparatus 70 according to Embodiment 3 includes the axial-flow fan 100 and therefore exerts the above advantageous effects of the axial-flow fan 100.

Embodiment 4

Figure 26:
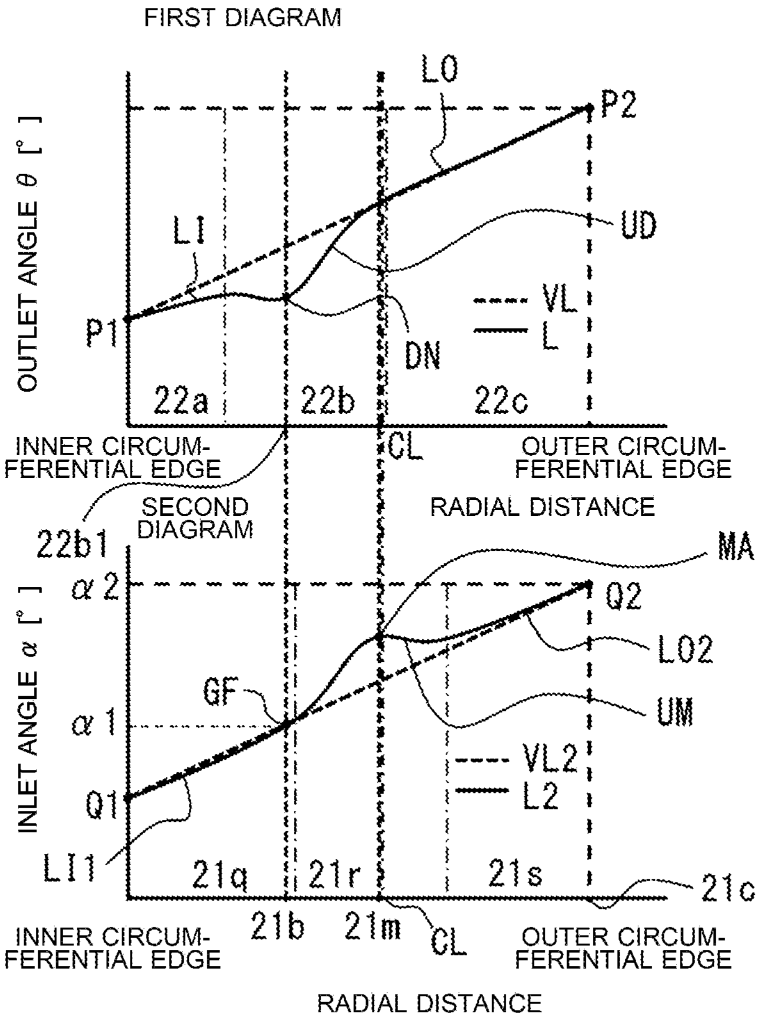
FIG. 26 illustrates the relationship established in the vane that is represented by a first diagram and a second diagram for an axial-flow fan according to Embodiment 4.

FIG. 26 illustrates the relationship established in the vane 20 that is represented by a first diagram and a second diagram for an axial-flow fan 100 according to Embodiment 4. In FIG. 26, the upper diagram is the first diagram described above, and the lower diagram is the second diagram to be described below for the axial-flow fan 100 according to Embodiment 4. In the second diagram, the horizontal axis represents the distance on the leading edge 21 in the radial direction of the axial-flow fan 100 from the inner circumferential edge 24 to the outer circumferential edge 23, and the vertical axis represents the size of the inlet angle α.

The second diagram in FIG. 26 illustrates, as a second line chart L2, the relationship between the size of the inlet angle α and the radial distance on the leading edge 21 from the inner circumferential edge 24 in the axial-flow fan 100.

A second virtual line chart VL2, provided in the second diagram in FIG. 26, is a linear virtual line connecting a point Q1 and a point Q2. The point Q1 represents the size of the inlet angle α formed at a point of the leading edge 21 that is at the inner circumferential edge 24 in the axial-flow fan 100. The point Q2 represents the size of the inlet angle α formed at a point of the leading edge 21 that is at the outer circumferential edge 23.

The second virtual line chart VL2 has a linear shape representing that the inlet angle α formed at the leading edge 21 increases at a constant rate from the inner circumferential edge 24 to the outer circumferential edge 23.

With reference to FIG. 26, the first diagram and the second diagram will be compared below with each other. When the first diagram and the second diagram are compared with each other, a point GF is defined in the second line chart L2 at a distance equal to the radial distance of the minimal possible point DN of the outlet angle θ represented in the first line chart L. An inlet angle α1 is formed at the point GF and is smaller than an inlet angle α2, which is formed at a point of the leading edge 21 that is at the outer circumferential edge 23.

As illustrated in FIG. 26, the second line chart L2 includes at least one upward convex portion UM, which is convex further upward than the second virtual line chart VL2. The upward convex portion UM may have a maximal possible point MA, where the inlet angle α is maximal possible in the upward convex portion UM.

As illustrated in FIGS. 26 and 19, the maximal possible point MA forms a leading-edge peak 22*m* on the leading edge 21. The leading-edge peak 22*m* is the peak of a part where the pressure surface 25 protrudes in the rotating direction RD. The part of the vane 20 that has the leading-edge peak 22*m* may be curved or may have an increased thickness.

The leading edge 21 includes a convex part 21*r*, which forms the upward convex portion UM. In the radial direction, the convex part 21*r* is located closer to the outer circumference of the vane 20 than the radial position of the peak 22*b*1 of the trailing edge 22 that forms the minimal possible point DN. In other words, the convex part 21*r* of the leading edge 21 that forms the upward convex portion UM is located closer to the outer circumference than the radial position of the leading-edge load-bearing point 21*b* formed at the point GF in the second line chart L2. The leading-edge peak 22*m* is located at the center position CL of the vane 20 in FIGS. 26 and 19 but does not necessarily need to be located at the center position CL of the vane 20.

The vane 20 of the axial-flow fan 100 includes, in the second line chart L2, a third linear portion LI1, which extends linearly at the leading edge 21 between the inner circumferential edge 24 and the upward convex portion UM. The upward convex portion UM has a steeper inclination than the third linear portion LI1. The vane 20 of the axial-flow fan 100 further includes, in the second line chart L2, a fourth linear portion L02, which extends linearly at the leading edge 21 between the outer circumferential edge 23 and the upward convex portion UM.

Here, a part of the leading edge 21 that forms the third linear portion LI1 of the second line chart L2 is defined as a region 21*q*, a part of the leading edge 21 that forms the upward convex portion UM of the second line chart L2 is defined as the convex part 21*r*, and a part that forms the fourth linear portion L02 of the second line chart L2 is defined as a region 21*s*. As illustrated in FIG. 19, the leading edge 21 of the axial-flow fan 100 has the region 21*q*, the convex part 21*r*, and the region 21*s* in that order from the inner circumference (Y1 side) toward the outer circumference (Y2 side).

The inlet angle α formed at the region 21*q* is smaller than the inlet angle α formed at the region 21*s*, and the inlet angle α formed at the region 21*s* is greater than the inlet angle α formed at the region 21*q*. Accordingly, in view of the inlet angle α, the axial-flow fan 100 is shaped such that the vane load to be borne is greater at a region that is divided by the upward convex portion UM and is close to the inner circumference than at a region that is divided by the upward convex portion UM and is close to the outer circumference.

Furthermore, in each of the region 21*q* and the region 21*s*, the axial-flow fan 100 is shaped such that the inlet angle α increases from a region close to the inner circumference toward a region close to the outer circumference.

[Operational Effects of Axial-Flow Fan 100 and Outdoor Unit 50]

The convex part 21*r* of the leading edge 21 that forms the upward convex portion UM is located, in the radial direction, closer to the outer circumference of the vane 20 than the radial position of the peak 22*b*1 of the trailing edge 22 that forms the minimal possible point DN. In the axial-flow fan 100 configured as above, the vane load to be borne on the leading edge is made to vary significantly in the radial direction. Thus, the airflow is induced toward a radial position of the trailing edge 22 that is in the second region 22*b*. Consequently, in the axial-flow fan 100, compared with the case of the axial-flow fan 100 according to Embodiment 1, more airflow is induced toward the second region 22*b* where the trailing edge 22 has the minimal possible point DN, and the air blown from the axial-flow fan 100 therefore produces a wind-speed distribution WL that is more even in the radial direction.

The upward convex portion UM has the maximal possible point MA where the value is maximal possible. In the axial-flow fan 100 configured as above, the vane load to be borne on the leading edge is made to vary more significantly in the radial direction. Thus, the airflow is induced toward a radial position of the trailing edge 22 that is in the second region 22*b*. Consequently, in the axial-flow fan 100, compared with the case of the axial-flow fan 100 according to Embodiment 1, more airflow is induced toward the second region 22*b* where the trailing edge 22 has the minimal possible point DN, and the air blown from the axial-flow fan 100 therefore produces a wind-speed distribution WL that is more even in the radial direction.

The outdoor unit 50 for the air-conditioning apparatus 70 according to Embodiment 4 includes the axial-flow fan 100 and therefore exerts the above advantageous effects of the axial-flow fan 100.

Embodiment 5

Figure 27:
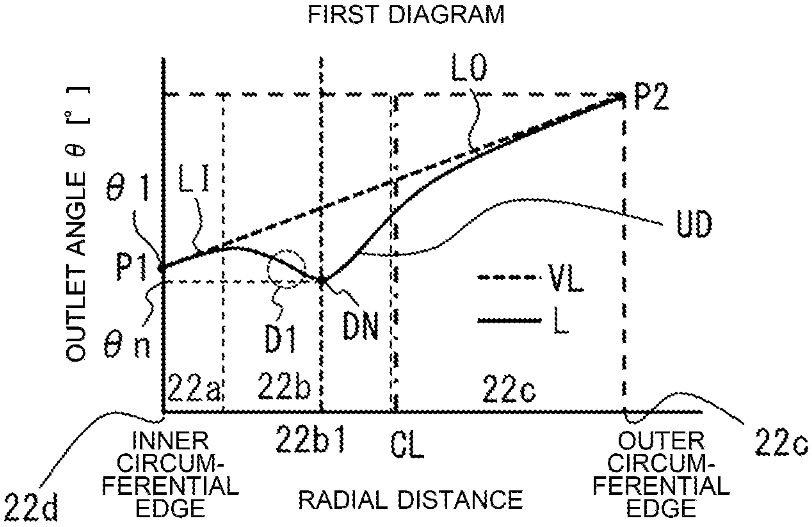
FIG. 27 illustrates the relationship between the radial distance and the size of the outlet angle θ in an axial-flow fan according to Embodiment 5.

FIG. 27 illustrates the relationship between the radial distance and the size of the outlet angle θ in an axial-flow fan 100 according to Embodiment 5. In the first diagram, the horizontal axis represents the distance on the trailing edge 22 in the radial direction of the axial-flow fan 100 from the inner circumferential edge 24 to the outer circumferential edge 23, and the vertical axis represents the size of the outlet angle θ. The axial-flow fan 100 according to Embodiment 5 will be described for specifying the position of the minimal possible point DN, illustrated in FIG. 13, of the axial-flow fan 100 according to Embodiment 1. Elements that have the same configurations as those of the axial-flow fan 100 and the outdoor unit 50 illustrated in any of FIGS. 1 to 26 are denoted by corresponding ones of the reference signs, and the description of such elements is omitted.

In the axial-flow fan 100 according to Embodiment 5, as illustrated in the first diagram in FIG. 27, an outlet angle θn is formed at the minimal possible point DN where the outlet angle θ is minimal possible. The outlet angle θn is smaller than the outlet angle θ1 formed at a point of the trailing edge 22 that is at the inner circumferential edge 24 (outlet angle θn<outlet angle θ1). In other words, in the axial-flow fan 100, the outlet angle θn formed at the peak 22*b*1 of the trailing edge 22 is smaller than the outlet angle θ1 formed at the trailing-edge inner circumferential point 22*d*, which is a point of the trailing edge 22 that is at the inner circumferential edge 24.

[Operational Effects of Axial-Flow Fan 100 and Outdoor Unit 50]

Figure 28:
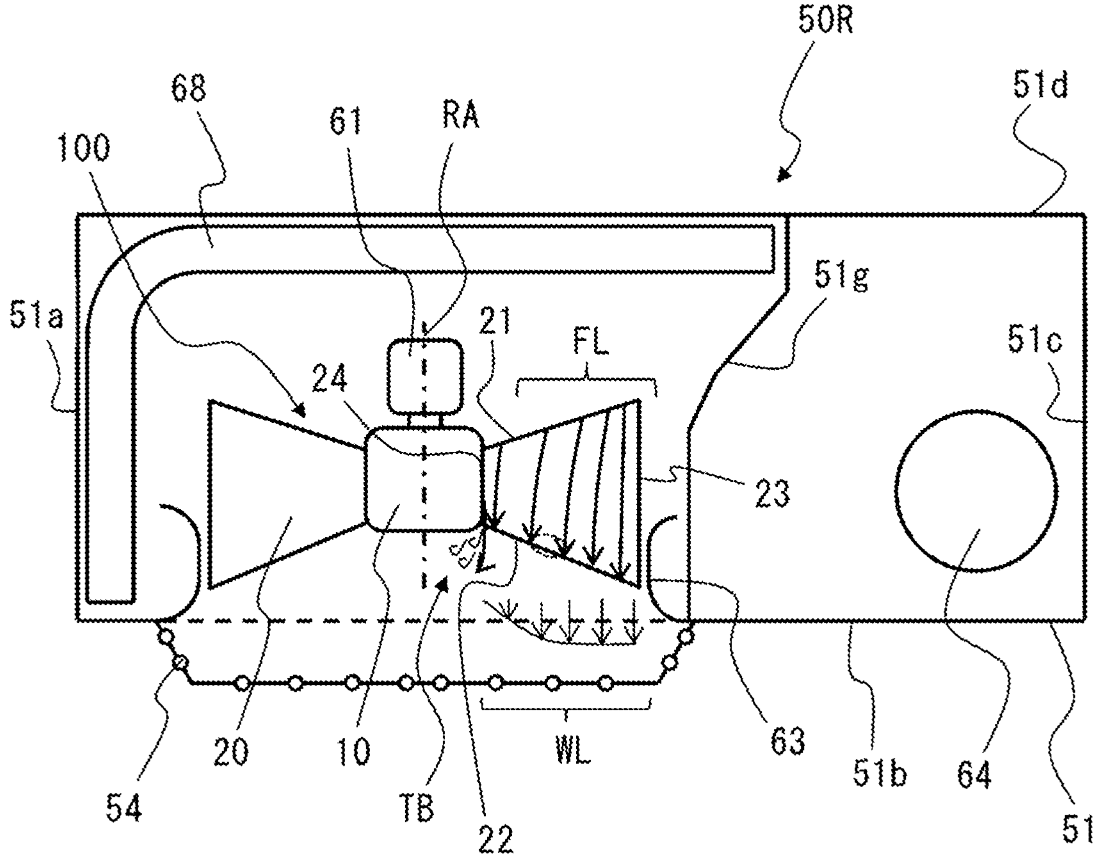
FIG. 28 is a conceptual top view of an outdoor unit including an axial-flow fan according to Comparative Example.
Figure 29:
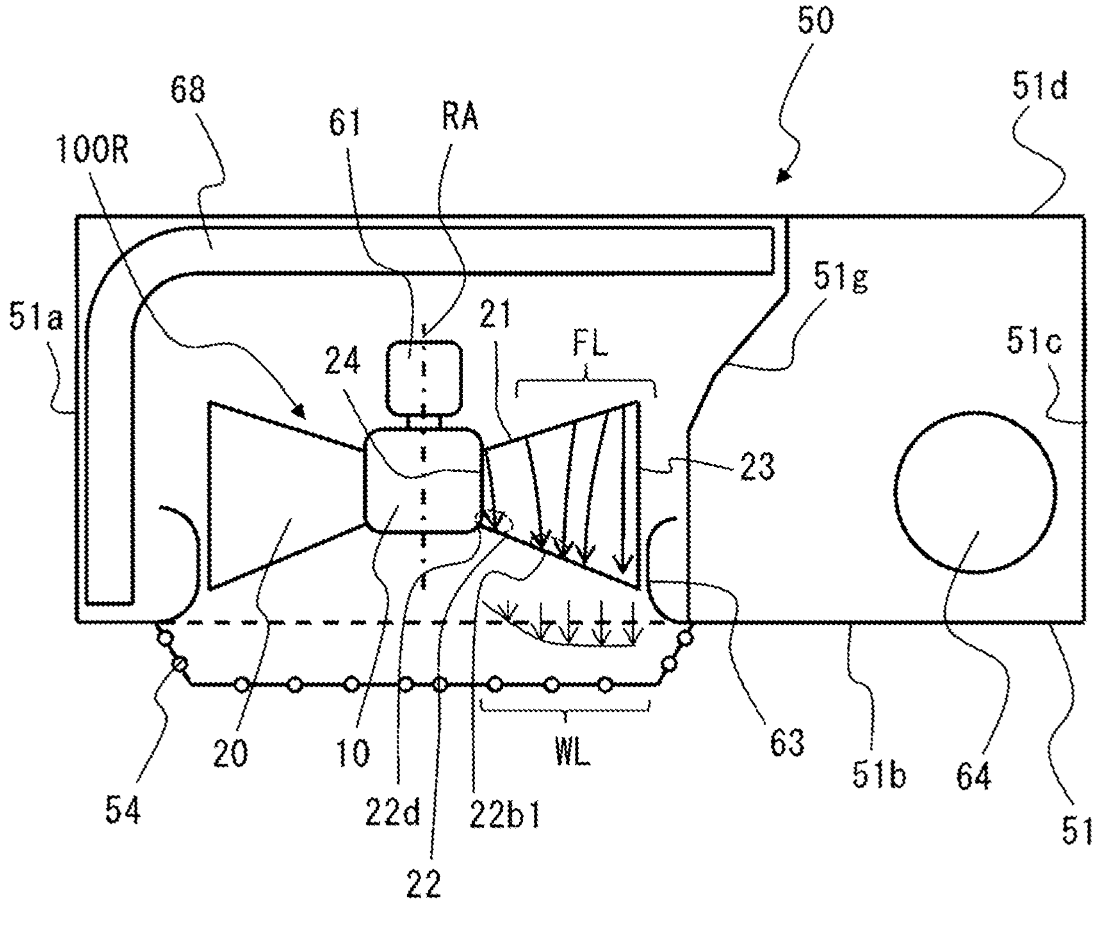
FIG. 29 is a conceptual top view of an outdoor unit including the axial-flow fan according to Embodiment 5.

FIG. 28 is a conceptual top view of an outdoor unit 50R including an axial-flow fan 100R according to Comparative Example. FIG. 29 is a conceptual top view of the outdoor unit 50 including the axial-flow fan 100 according to Embodiment 5. In FIGS. 28 and 29, the axial-flow fan 100 and the axial-flow fan 100R are each illustrated as a revolved projection on a meridional plane containing the rotation axis RA and the vanes 20.

When too much airflow is gathered toward the inner circumference of the axial-flow fan 100 as in the case of the axial-flow fan 100R according to Comparative Example illustrated in FIG. 28, the airflow around the hub 10 causes turbulence TB when leaving a downstream part of the hub 10.

In the axial-flow fan 100 according to Embodiment 5, as described above, the outlet angle θn at the minimal possible point DN in the first diagram is smaller than the outlet angle θ1 formed at a point of the trailing edge 22 that is at the inner circumferential edge 24. The outlet angle θ1 is the outlet angle at the innermost circumferential point of the trailing edge 22. In other words, the axial-flow fan 100 has a minimal possible point DN that represents an outlet angle θ that is smaller than that at the innermost circumferential point of the fan and is closer to the outer circumference in the radial direction than the innermost circumferential point of the fan.

In the axial-flow fan 100 configured as above, while the airflow at the outer circumference of the fan is induced toward the peak 22*b*1 forming the minimal possible point DN, the amount of airflow induced toward the hub 10 located closer to the inner circumference, which is further inside than the peak 22*b*1 forming the minimal possible point DN is reduced. Therefore, in the axial-flow fan 100 illustrated in FIG. 29, turbulence TB that tends to occur when the airflow around the hub 10 leaves a downstream part of the hub 10 is controlled. Consequently, in the outdoor unit 50, the generation of noise due to turbulence TB is controlled, and the increase in the fan input due to turbulence TB is controlled.

In the axial-flow fan 100 according to Embodiment 5 illustrated in FIG. 29, the airflow is induced toward the peak 22*b*1 of the trailing edge 22 that forms the minimal possible point DN. Therefore, the air blown from the axial-flow fan 100 produces a wind-speed distribution WL that is even in the radial direction.

The outdoor unit 50 for the air-conditioning apparatus 70 according to Embodiment 5 includes the axial-flow fan 100 and therefore exerts the above advantageous effects of the axial-flow fan 100.

Embodiment 6

Figure 30:
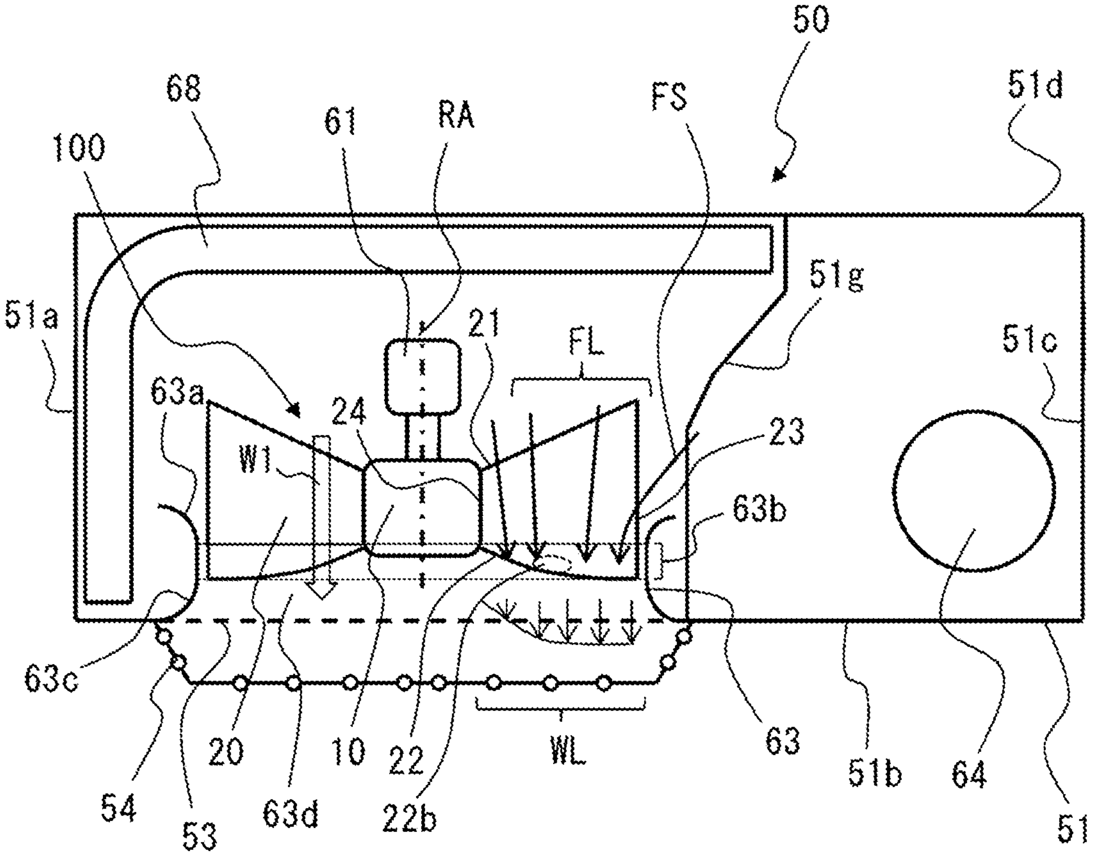
FIG. 30 is a conceptual top view of an outdoor unit according to Embodiment 6.

FIG. 30 is a conceptual top view of an outdoor unit 50 according to Embodiment 6. In FIG. 30, the axial-flow fan 100 is illustrated as a revolved projection on a meridional plane containing the rotation axis RA and the vanes 20. Elements that have the same configurations as those of the axial-flow fan 100 and the outdoor unit 50 illustrated in any of FIGS. 1 to 29 are denoted by corresponding ones of the reference signs, and the description of such elements is omitted. The outdoor unit 50 according to Embodiment 6 will be described for specifying the relationship between the axial-flow fan 100 and the bell mouth 63. In FIG. 30, arrows FS represent exemplary flows of air taken into the bell mouth 63.

The outdoor unit 50 includes the housing 51 including the front wall 51*b* in which the air outlet 53 is provided, the axial-flow fan 100 according to any of Embodiments 1 to 5 that is housed in the housing 51, and the bell mouth 63 provided at the air outlet 53 and surrounding the outer circumference of the axial-flow fan 100.

The bell mouth 63 extends in the axial direction of the rotation axis RA. The bell mouth 63 includes an inlet portion 63*a*, a straight portion 63*b*, and an outlet portion 63*c*, which are arranged from the upstream region toward the downstream region in a first direction W1, in which the airflow generated by the axial-flow fan 100 travels from the inside of the housing 51 to the outside through the opening, 63*d*, of the bell mouth 63.

The inlet portion 63*a* has an opening diameter that is greater at its upstream portion of the airflow than at its downstream portion in the first direction W1. The straight portion 63*b* is shaped as a straight pipe whose opening diameter is constant in the first direction W1. The outlet portion 63*c* has an opening diameter that is greater at its downstream portion of the airflow than at its upstream portion in the first direction W1.

In the outdoor unit 50, the second region 22*b* where the trailing edge 22 has the downward convex portion UD is at such a position as to be covered by the straight portion 63*b* in the axial direction of the rotation axis RA. That is, the second region 22*b* of the axial-flow fan 100 is positioned in the opening of the straight portion 63*b*. The second region 22*b* of the axial-flow fan 100 is located between the rotation axis RA and the straight portion 63*b* of the bell mouth 63.

[Operational Effects of Axial-Flow Fan 100 and Outdoor Unit 50]

The straight portion 63*b* of the bell mouth 63 is a portion of the bell mouth 63 where the opening 63*d* is narrowest. Therefore, the air taken in when the axial-flow fan 100 is in operation concentrates most in the straight portion 63*b* among the portions of the bell mouth 63.

In the outdoor unit 50 according to Embodiment 6, the second region 22*b* where the trailing edge 22 has the downward convex portion UD is at such a position as to be covered by the straight portion 63*b* where the airflow concentrates. Accordingly, in the outdoor unit 50 according to Embodiment 6, the vane load to be borne at the inner circumference of the axial-flow fan 100 is increased more than in an outdoor unit in which the second region 22*b* is not at such a position as to be covered by the straight portion 63*b*.

The outdoor unit 50 according to Embodiment 6 includes the axial-flow fan 100 according to any of Embodiments 1 to 5. Therefore, the outdoor unit 50 according to Embodiment 6 exerts the above advantageous effects of the axial-flow fan 100.

Embodiment 7

Figure 31:
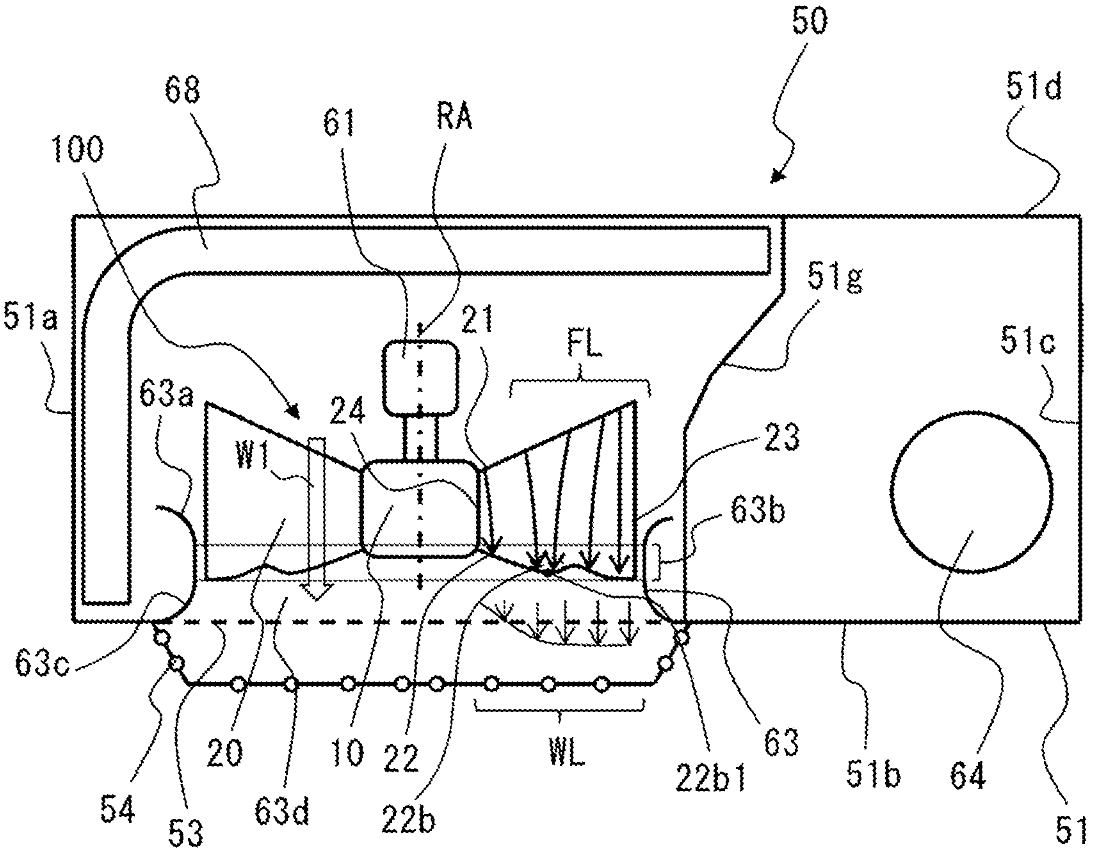
FIG. 31 is a conceptual top view of an outdoor unit according to Embodiment 7.

FIG. 31 is a conceptual top view of an outdoor unit 50 according to Embodiment 7. In FIG. 31, the axial-flow fan 100 is illustrated as a revolved projection on a meridional plane containing the rotation axis RA and the vanes 20. Elements that have the same configurations as those of the axial-flow fan 100 and the outdoor unit 50 illustrated in any of FIGS. 1 to 30 are denoted by corresponding ones of the reference signs, and the description of such elements is omitted. The outdoor unit 50 according to Embodiment 7 will be described for specifying the shape of the vane 20 of the axial-flow fan 100.

In the outdoor unit 50 according to Embodiment 7, the second region 22*b* where the trailing edge 22 has the downward convex portion UD has a convex shape protruding downstream of the airflow in the axial direction of the rotation axis RA.

When the second region 22*b* shaped to be convex has the peak 22*b*1 forming the minimal possible point DN as described above, the convex second region 22*b* may have, for example, a substantially triangular shape forming a mountain having the peak 22*b*1 at the top in the axial direction. The convex second region 22*b* does not necessarily need to have a substantially triangular shape and may be, for example, a protrusion with an arc-shaped edge or may be substantially polygonal.

[Operational Effects of Axial-Flow Fan 100 and Outdoor Unit 50]

Airflow is affected by the viscosity of the vane surface. Therefore, when the position of the trailing edge 22 in the axial direction varies in the radial direction, air tends to flow toward a more downstream part of the trailing edge 22. Since the second region 22*b* having the downward convex portion UD has a convex shape protruding downstream of the airflow, the axial-flow fan 100 exerts the viscosity of the vane surface and thus induces the airflow toward the second region 22*b* where the trailing edge 22 has the downward convex portion UD.

Therefore, the air blown from the axial-flow fan 100 of the outdoor unit 50 according to Embodiment 7 produces a wind-speed distribution WL that is even in the radial direction. Consequently, the outdoor unit 50 generates reduced noise that tends to occur at the collision with structures including the fan grille that are located downstream of the axial-flow fan 100. Furthermore, as described above, the fan input to the axial-flow fan 100 is reduced.

Embodiment 8

Figure 32:
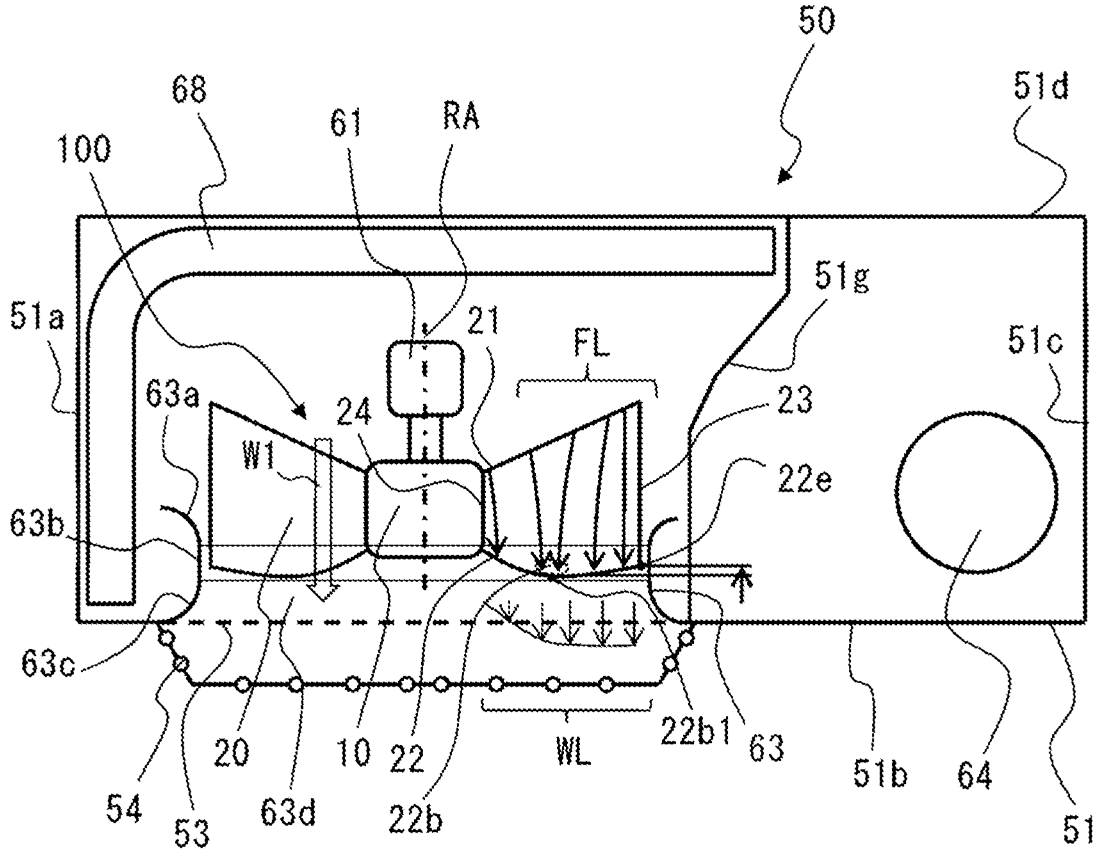
FIG. 32 is a conceptual top view of an outdoor unit according to Embodiment 8.

FIG. 32 is a conceptual top view of an outdoor unit 50 according to Embodiment 8. In FIG. 32, the axial-flow fan 100 is illustrated as a revolved projection on a meridional plane containing the rotation axis RA and the vanes 20. Elements that have the same configurations as those of the axial-flow fan 100 and the outdoor unit 50 illustrated in any of FIGS. 1 to 31 are denoted by corresponding ones of the reference signs, and the description of such elements is omitted. The outdoor unit 50 according to Embodiment 8 will be described for specifying the shape of the vane 20 of the axial-flow fan 100.

The trailing edge 22 of the axial-flow fan 100 is shaped such that, at a region closer to the outer circumference than the second region 22*b* where the downward convex portion UD is formed, the trailing edge 22 is shifted upstream of the airflow while extending from the second region 22*b* where the downward convex portion is formed to the outer circumferential edge 23.

Here, a point of the trailing edge 22 that is at the outer circumferential edge 23 is defined as a trailing-edge outer circumferential point 22*e*. The trailing-edge outer circumferential point 22*e* is the outermost circumferential point of the trailing edge 22. As illustrated in FIG. 32, the trailing-edge outer circumferential point 22*e* is located upstream of the second region 22*b* in the direction of the airflow. When the second region 22*b* has the peak 22*b*1 forming the minimal possible point DN described above, the trailing-edge outer circumferential point 22*e* is located upstream of the peak 22*b*1 in the direction of the airflow.

Figure 33:
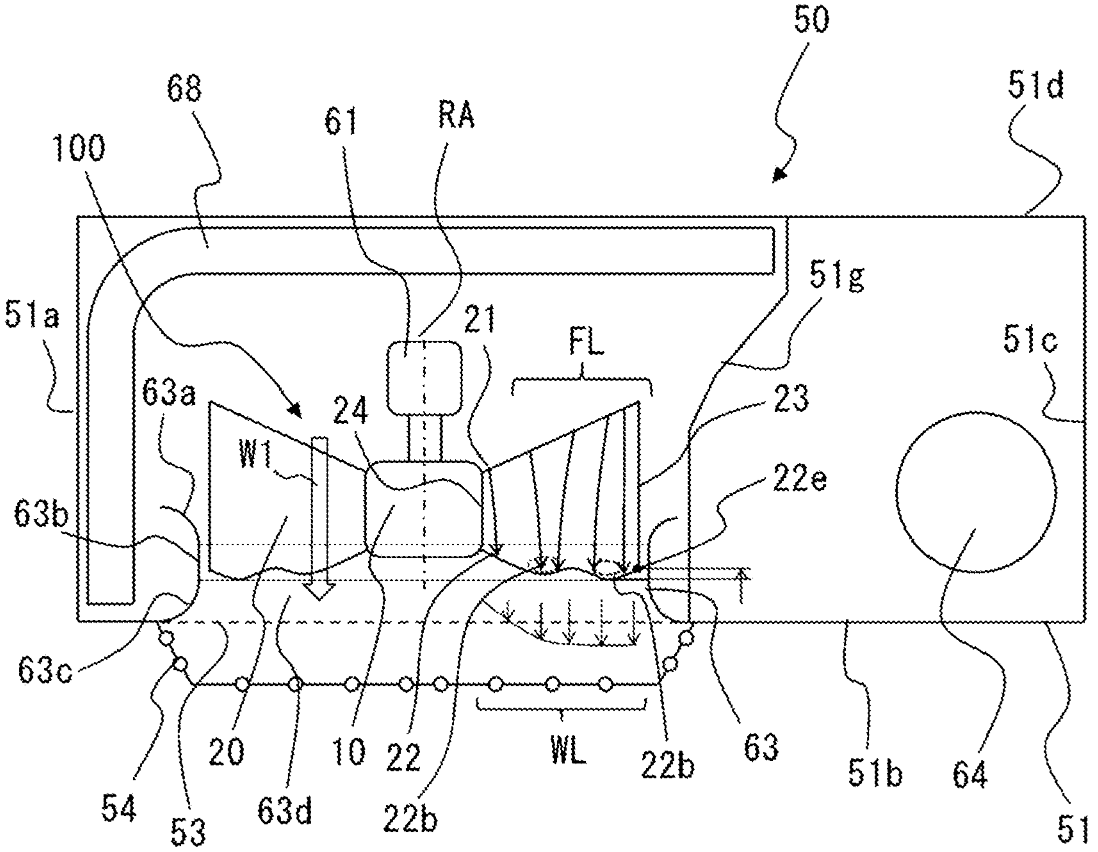
FIG. 33 is a conceptual top view of a modification of the outdoor unit according to Embodiment 8.

FIG. 33 is a conceptual top view of a modification of the outdoor unit 50 according to Embodiment 8. In FIG. 33, the axial-flow fan 100 is illustrated as a revolved projection on a meridional plane containing the rotation axis RA and the vanes 20. As illustrated in FIG. 33, the trailing edge 22 in the outdoor unit 50 may include a plurality of second regions 22*b*. When the trailing edge 22 of the axial-flow fan 100 includes a plurality of second regions 22*b*, a part of the trailing edge 22 that is at a region closer to the outer circumference than the outermost one of the second regions

22*b* is shifted upstream of the airflow while extending from the second region 22*b* toward the outer circumferential edge 23.

When the trailing edge 22 of the axial-flow fan 100 includes a plurality of second regions 22*b* as illustrated in FIG. 33, the trailing-edge outer circumferential point 22*e* is located upstream, in the direction of the airflow, of the outermost one of the second regions 22*b*.

[Operational Effects of Axial-Flow Fan 100 and Outdoor Unit 50]

As described above, the air taken in when the axial-flow fan 100 is in operation concentrates most in the straight portion 63*b* among the portions of the bell mouth 63. Furthermore, in the outdoor unit 50, the greater the surface area of the part of the vane 20 that is positioned in the straight portion 63*b* of the bell mouth 63, the greater the vane load to be borne by this part.

The trailing edge 22 of the axial-flow fan 100 is shaped such that, at a region closer to the outer circumference than the second region 22*b* where the downward convex portion UD is formed, the trailing edge 22 is shifted upstream of the airflow while extending from the second region 22*b* where the downward convex portion is formed to the outer circumferential edge 23. In the outdoor unit 50, when the area of the part that is located at the outer circumference of the axial-flow fan 100 and is positioned in the straight portion 63*b* is reduced, the vane load to be borne at the outer circumference is relatively reduced, which increases the vane load to be borne by the second region 22*b* where the downward convex portion UD is formed.

Therefore, in the axial-flow fan 100, more airflow is induced toward the second region 22*b* where the downward convex portion UD is formed, and the air blown from the axial-flow fan 100 of the outdoor unit 50 according to Embodiment 8 produces a wind-speed distribution WL that is even in the radial direction. Consequently, the outdoor unit 50 generates reduced noise that tends to occur at the collision with structures including the fan grille that are located downstream of the axial-flow fan 100. Furthermore, as described above, the fan input to the axial-flow fan 100 is reduced.

Embodiment 9

Figure 34:
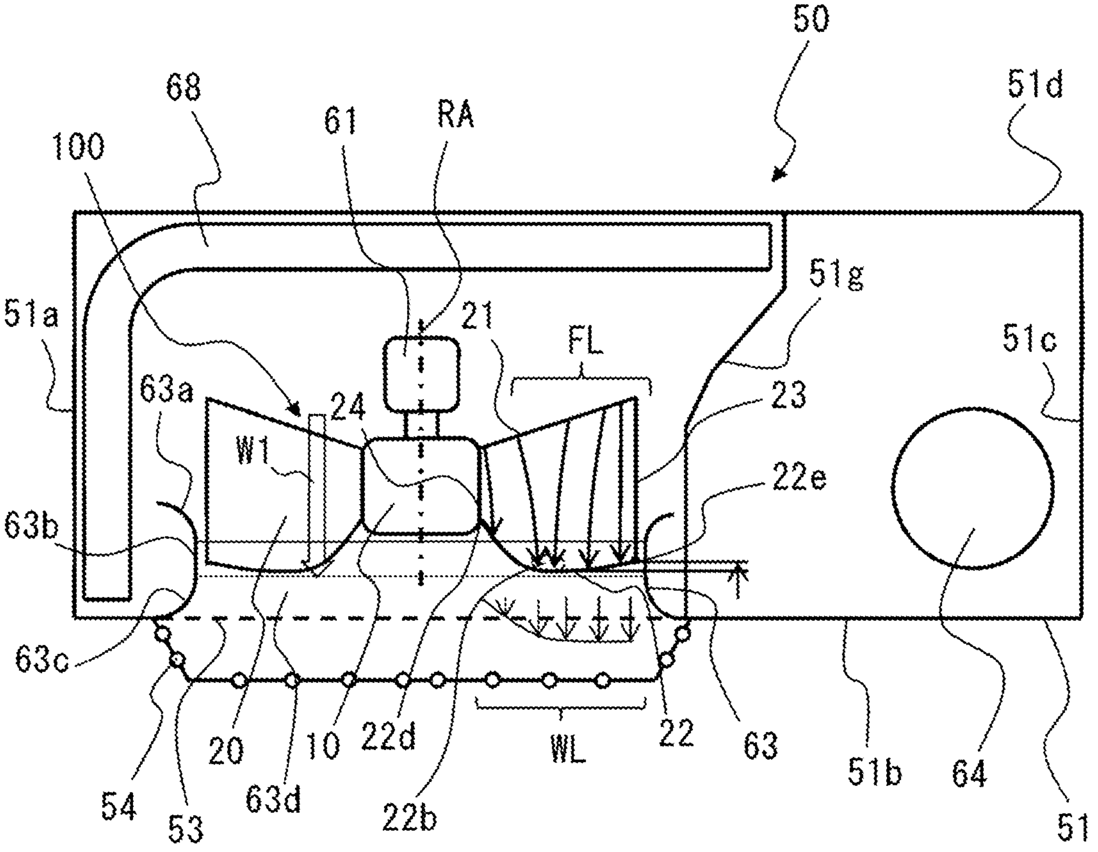
FIG. 34 is a conceptual top view of an outdoor unit according to Embodiment 9.

FIG. 34 is a conceptual top view of an outdoor unit 50 according to Embodiment 9. In FIG. 34, the axial-flow fan 100 is illustrated as a revolved projection on a meridional plane containing the rotation axis RA and the vanes 20. Elements that have the same configurations as those of the axial-flow fan 100 and the outdoor unit 50 illustrated in any of FIGS. 1 to 33 are denoted by corresponding ones of the reference signs, and the description of such elements is omitted. The outdoor unit 50 according to Embodiment 9 will be described for specifying the relationship between the axial-flow fan 100 and the bell mouth 63.

In the outdoor unit 50 according to Embodiment 9, a part of the trailing edge 22 that is connected to the hub 10 is located upstream of the straight portion 63*b* in the direction of the airflow, that is, at such a position in the axial direction of the rotation axis RA as not to be covered by the straight portion 63*b*.

Here, as described above, a point of the trailing edge 22 that is at the inner circumferential edge 24 is defined as a trailing-edge inner circumferential point 22*d*. The trailing-edge inner circumferential point 22*d* is the innermost circumferential point of the trailing edge 22 and a part of the trailing edge 22 that is connected to the hub 10. That is, the trailing-edge inner circumferential point 22*d* is located upstream of the straight portion 63*b* in the direction of the airflow and at such a position in the axial direction of the rotation axis RA as not to be covered by the straight portion 63*b*. In other words, the trailing-edge inner circumferential point 22*d* the second region 22*b* of the axial-flow fan 100 is not positioned in the opening defined by the straight portion 63*b*.

Figure 35:
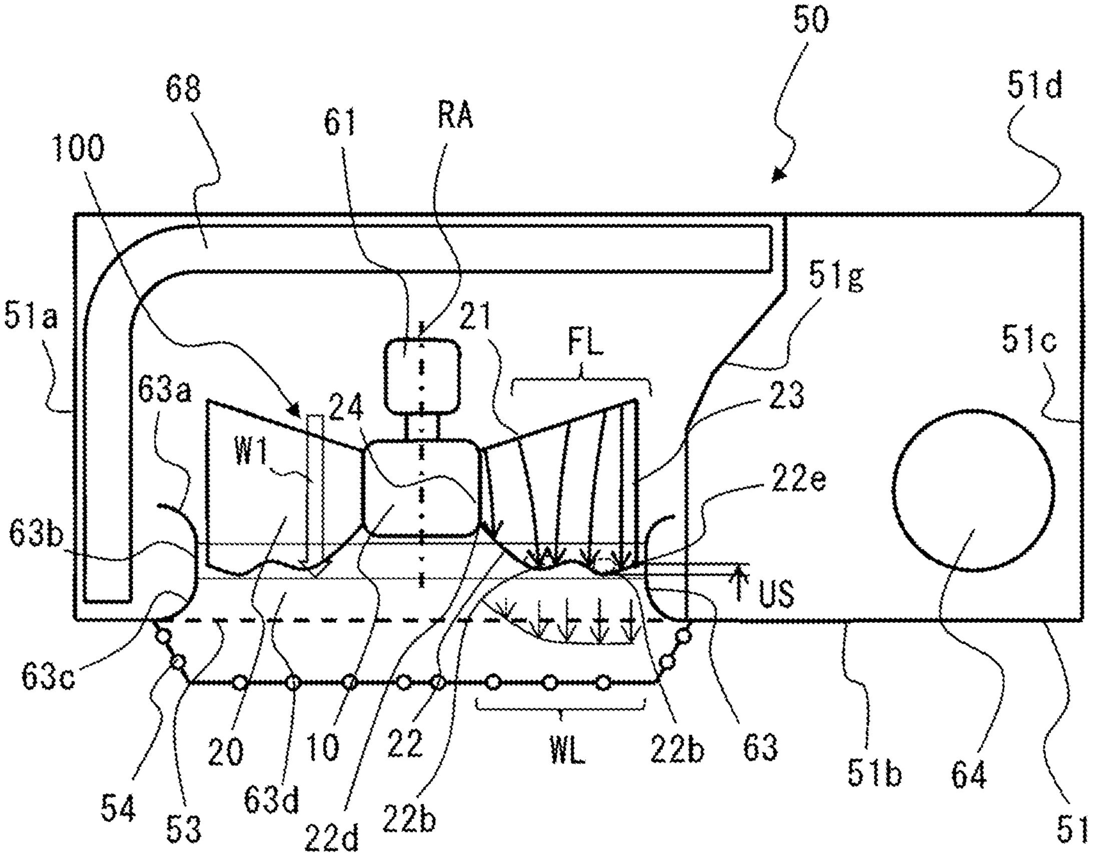
FIG. 35 is a conceptual top view of a modification of the outdoor unit according to Embodiment 9.

FIG. 35 is a conceptual top view of a modification of the outdoor unit 50 according to Embodiment 9. In FIG. 35, the axial-flow fan 100 is illustrated as a revolved projection on a meridional plane containing the rotation axis RA and the vanes 20. As illustrated in FIG. 35, the trailing edge 22 in the outdoor unit 50 may include a plurality of second regions 22*b*.

[Operational Effects of Axial-Flow Fan 100 and Outdoor Unit 50]

As described in Embodiment 5, when too much airflow is gathered toward the inner circumference of the axial-flow fan 100, the airflow around the hub 10 causes turbulence TB when leaving a downstream part of the hub 10. Furthermore, as described in Embodiment 8, the air taken in when the axial-flow fan 100 is in operation concentrates most in the straight portion 63*b* among the portions of the bell mouth 63. Furthermore, in the outdoor unit 50, the greater the surface area of the part of the vane 20 that is positioned in the straight portion 63*b* of the bell mouth 63, the greater the vane load to be borne by this part.

In the outdoor unit 50 according to Embodiment 9, as described above, the part of the trailing edge 22 that is connected to the hub 10 is located upstream of the straight portion 63*b* in the direction of the airflow, that is, at such a position in the axial direction of the rotation axis RA as not to be covered by the straight portion 63*b*. In the outdoor unit 50, since the innermost circumferential point of the trailing edge 22 is not covered by the straight portion 63*b*, the vane load to be borne by the innermost circumferential point is relatively reduced, whereby the vane load to be borne by the second region 22*b* where the downward convex portion UD is formed is increased.

In the axial-flow fan 100 configured as above, while the airflow at the outer circumference of the axial-flow fan 100 is induced toward the second region 22*b* where the downward convex portion UD is formed, the amount of airflow induced toward the hub 10 located closer to the inner circumference than the second region 22*b* is reduced. Therefore, in the axial-flow fan 100, turbulence TB that tends to occur when the airflow around the hub 10 leaves a downstream part of the hub 10 is controlled. Consequently, in the outdoor unit 50, the generation of noise due to turbulence TB is controlled, and the increase in the fan input due to turbulence TB is controlled.

Embodiment 10

Figure 36:
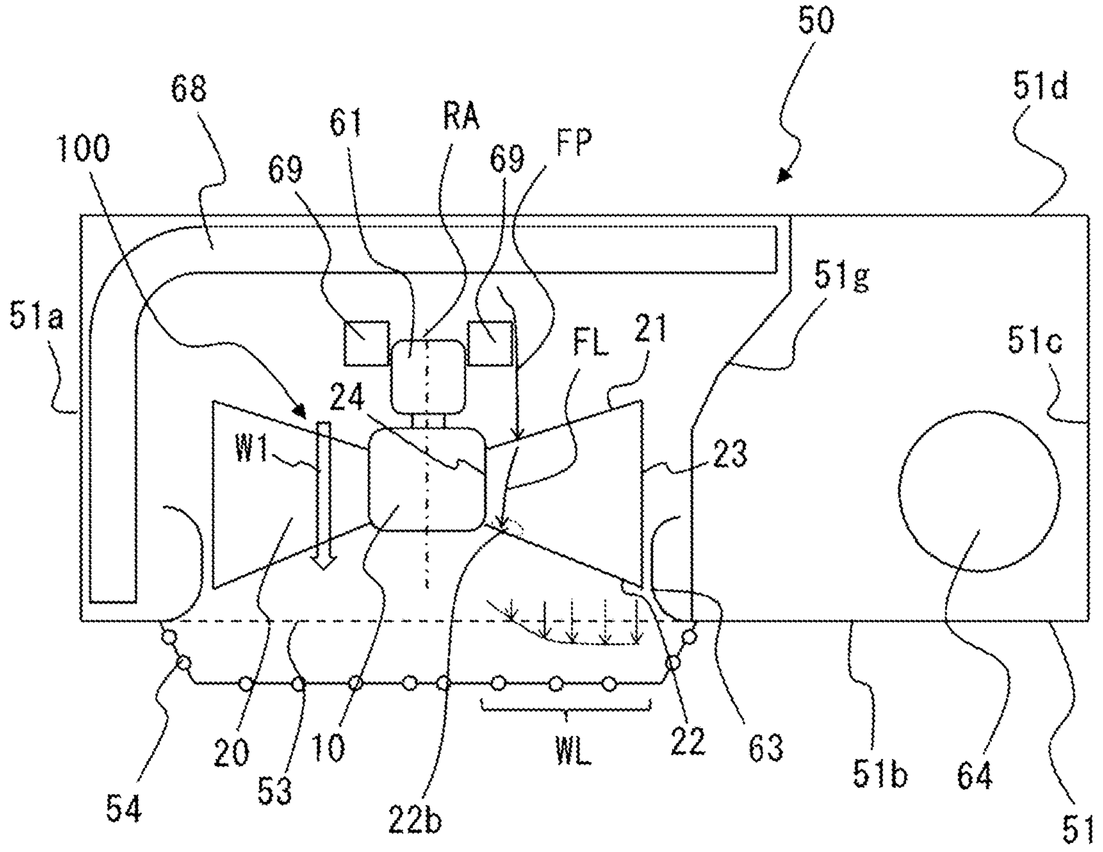
FIG. 36 is a conceptual top view of an outdoor unit according to Embodiment 10.

FIG. 36 is a conceptual top view of an outdoor unit 50 according to Embodiment 10. In FIG. 36, the axial-flow fan 100 is illustrated as a revolved projection on a meridional plane containing the rotation axis RA and the vanes 20. Elements that have the same configurations as those of the axial-flow fan 100 and the outdoor unit 50 illustrated in any of FIGS. 1 to 35 are denoted by corresponding ones of the reference signs, and the description of such elements is omitted. The outdoor unit 50 according to Embodiment 10 will be described for specifying the relationship between the axial-flow fan 100 and the motor support 69.

As described in Embodiment 1, the motor 61 is attached to the motor support 69. The motor support 69 supports the motor 61, which is configured to rotate the hub 10. The motor support 69 extends in the vertical direction of the outdoor unit 50. The motor support 69 has, for example, a plate shape or a columnar shape.

The motor support 69 is configured such that at least a part of the motor support 69 is located further outside than the motor 61 in the radial direction about the rotation axis RA. Furthermore, at least a part of the motor support 69 overlaps each of the vanes 20 of the axial-flow fan 100 in the axial direction of the rotation axis RA.

In the direction of the airflow generated in the housing 51 by the axial-flow fan 100, the motor support 69 is located upstream of the vanes 20, and the vanes 20 are located downstream of the motor support 69.

Figure 37:
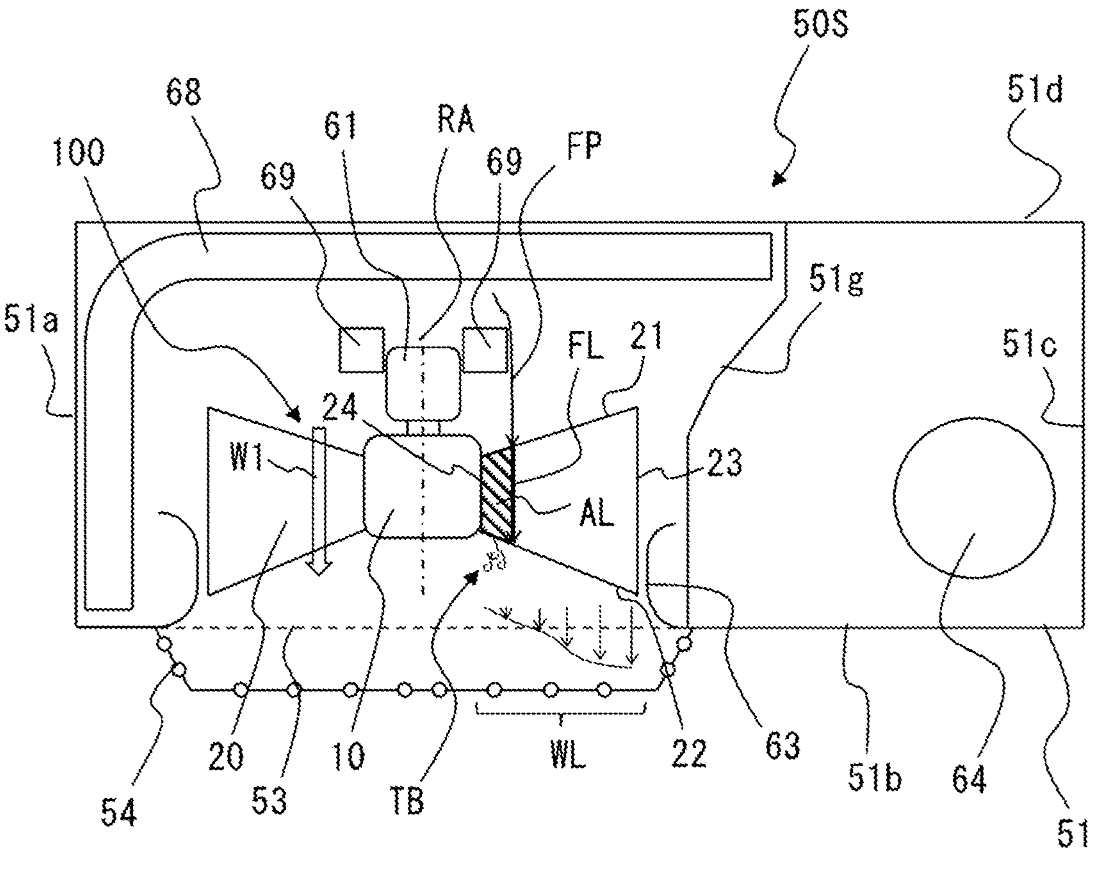
FIG. 37 is a conceptual top view of an outdoor unit according to Comparative Example.

FIG. 37 is a conceptual top view of an outdoor unit 50S according to Comparative Example. In FIG. 37, the axial-flow fan 100 is illustrated as a revolved projection on a meridional plane containing the rotation axis RA and the vanes 20. In the outdoor unit 50S illustrated in FIG. 37, inflow air FP is typically hindered by the motor support 69 in a radial area AL of each of the vanes 20 that overlaps the motor support 69. Therefore, the airflow FL blown from the axial-flow fan 100 of the outdoor unit 50S includes significant turbulence TB.

In the top view of the outdoor unit 50 as illustrated in FIG. 36, the second region 22*b* where the trailing edge 22 has the downward convex portion UD is located at such a position as to overlap the motor support 69 in the axial direction.

[Operational Effects of Axial-Flow Fan 100 and Outdoor Unit 50]

In the outdoor unit 50, as described above, the second region 22*b* where the trailing edge 22 has the downward convex portion UD is located at such a position as to overlap the motor support 69 in the axial direction. In the outdoor unit 50, since the second region 22*b* overlaps the motor support 69, the airflow is made to flow into the radial area AL of each of the vanes 20 that is located downstream of the motor support 69, whereby the occurrence of turbulence TB is controlled. Consequently, in the outdoor unit 50, the generation of noise due to turbulence TB is controlled, and the increase in the fan input due to turbulence TB is controlled.

Embodiment 11

Figure 38:
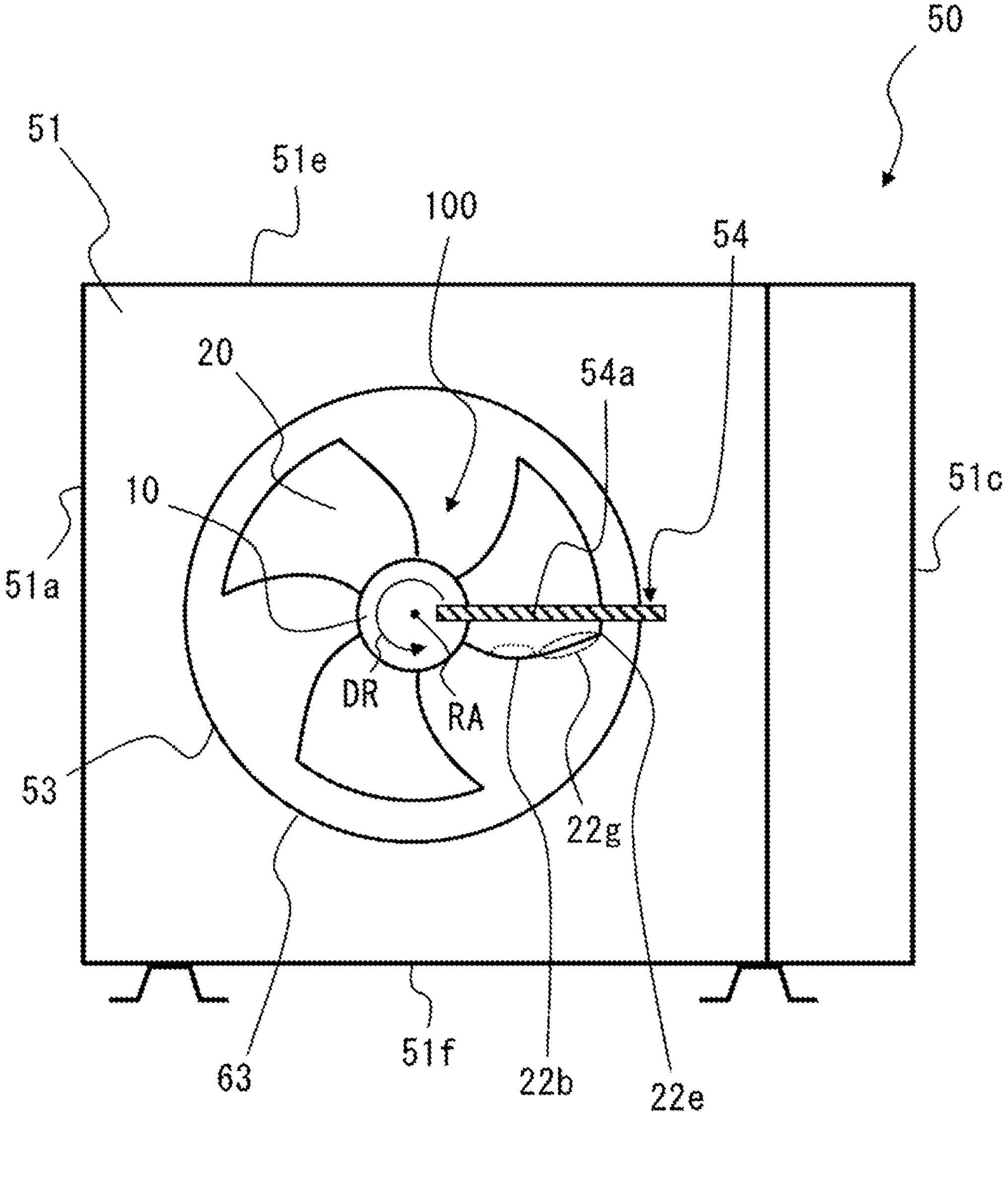
FIG. 38 is a conceptual front view of an outdoor unit according to Embodiment 11.
Figure 39:
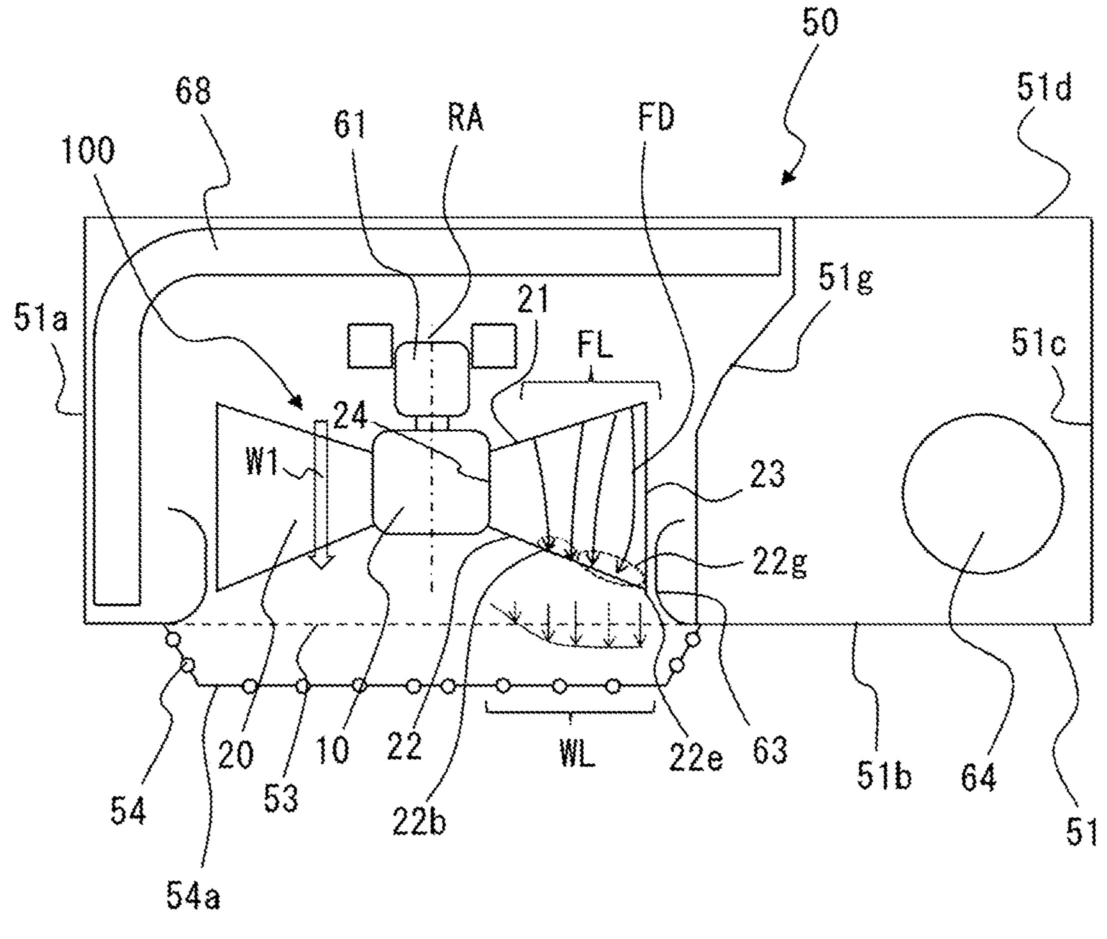
FIG. 39 is a conceptual top view of the outdoor unit according to Embodiment 11.

FIG. 38 is a conceptual front view of an outdoor unit 50 according to Embodiment 11. FIG. 39 is a conceptual top view of the outdoor unit 50 according to Embodiment 11. In FIG. 39, the axial-flow fan 100 is illustrated as a revolved projection on a meridional plane containing the rotation axis RA and the vanes 20. For describing the relationship between each of the vanes 20 of the axial-flow fan 100 and any of the bars 54*a* of the fan grille 54, FIG. 38 only illustrates some part of the fan grille 54 and does not illustrate the other part of the fan grille 54. Elements that are the same as those of the axial-flow fan 100 and the outdoor unit 50 illustrated in any of FIGS. 1 to 37 are denoted by corresponding ones of the reference signs, and the description of such elements is omitted. The outdoor unit 50 according to Embodiment 11 will be described for specifying the relationship between the axial-flow fan 100 and the fan grille 54.

As described in Embodiment 1, the outdoor unit 50 includes the fan grille 54 at the air outlet 53 to prevent the insertion of hand fingers of any person into the housing 51. The fan grille 54 includes, among bars, a plurality of bars 54*a* that each extend in the horizontal direction and are arranged in the vertical direction. The fan grille 54 is located downstream of the axial-flow fan 100 in the direction of the airflow.

In the front view of the outdoor unit 50 as illustrated in FIG. 38, the outdoor unit 50 includes a preceding region 22*g*, which is located at a region closer to the outer circumference than the second region 22*b*. When the vanes 20 rotate and the trailing edge 22 of each of the vanes 20 passes by any of the bars 54*a* of the fan grille 54, the preceding region 22*g* passes by the bar 54*a* of the fan grille 54 earlier than the second region 22*b*. As described above, the second region 22*b* is a part where the trailing edge 22 has the downward convex portion UD.

In the front view of the outdoor unit 50, when the vanes 20 rotate and the trailing edge 22 of each of the vanes 20 passes by any of the bars 54*a* of the fan grille 54, the trailing-edge outer circumferential point 22*e* that is the outermost circumferential point of the trailing edge 22 passes by the bar 54*a* of the fan grille 54 earlier than the second region 22*b*.

Figure 40:
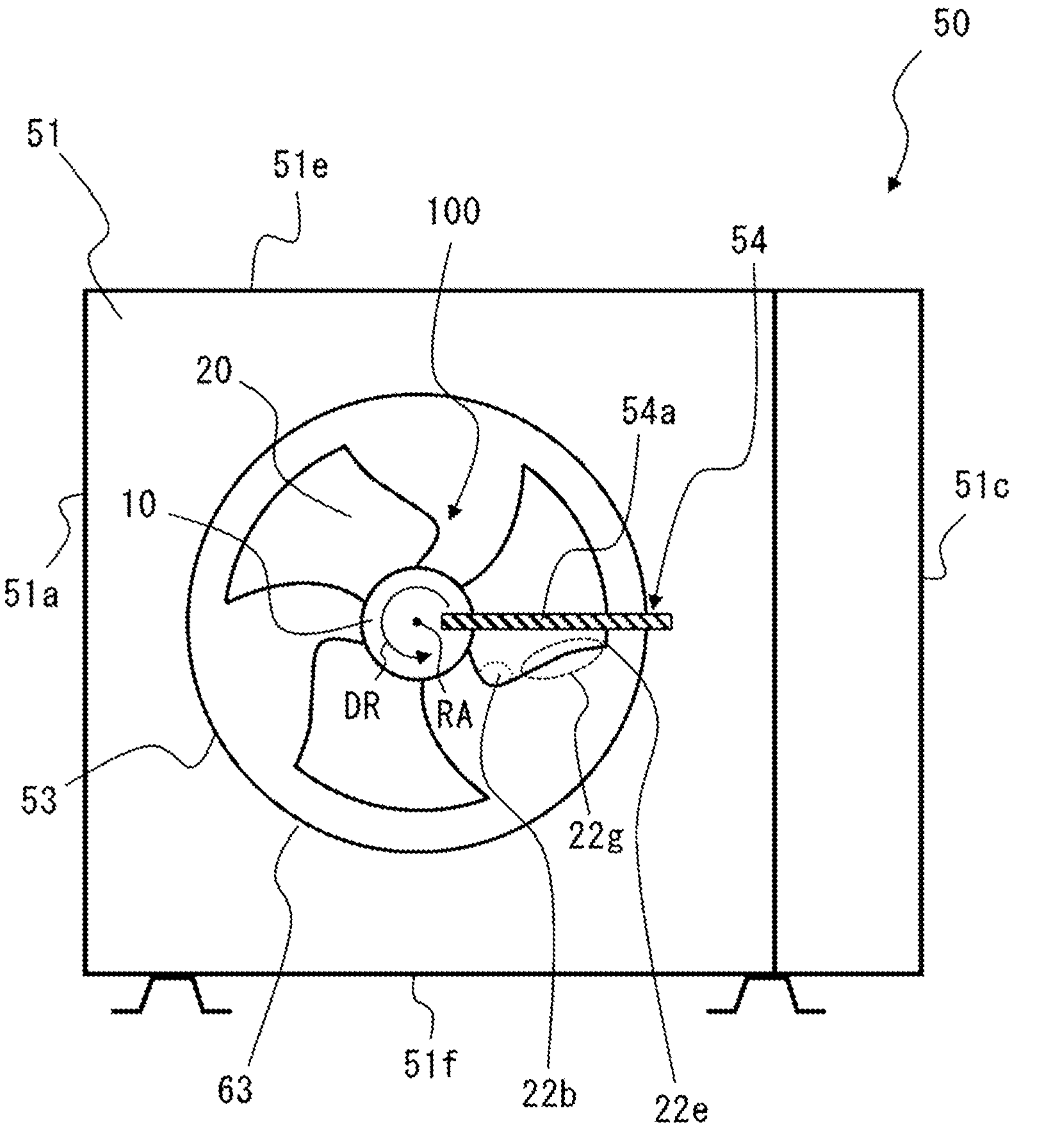
FIG. 40 is a conceptual front view of a modification of the outdoor unit according to Embodiment 11.

FIG. 40 is a conceptual front view of a modification of the outdoor unit 50 according to Embodiment 11. In the outdoor unit 50, as illustrated in FIG. 40, the second region 22*b* where the trailing edge 22 has the downward convex portion UD may have a convex shape protruding in the direction opposite to the rotating direction DR of the vane 20.

[Operational Effects of Axial-Flow Fan 100 and Outdoor Unit 50]

In a typical outdoor unit, in front view, when the trailing edge 22 of the vane 20 passes by the bar 54*a* of the fan grille 54, the airflow flowing out from the trailing edge 22 collides with the bar 54*a* of the fan grille 54, whereby a great resistance is generated on the vane 20.

Since a great resistance is generated at the trailing edge 22 passing by the bar 54*a* of the fan grille 54, as illustrated in FIG. 39, airflow FD generated around the vane travels toward any radial part of the trailing edge 22 other than the part that is passing by the bar 54*a* of the fan grille 54.

In the outdoor unit 50, the preceding region 22*g* that passes by the bar 54*a* of the fan grille 54 earlier than the second region 22*b* is provided at a region closer to the outer circumference than the second region 22*b*. That is, when the axial-flow fan 100 is in operation, a part at a region closer to the outer circumference than the second region 22*b* receives the resistance of the air earlier than the second region 22*b*. Therefore, the air taken into the outdoor unit 50 flows into the second region 22*b*, whereby the air blown from the axial-flow fan 100 produces a wind-speed distribution that is even in the radial direction. Consequently, the outdoor unit 50 generates reduced noise that tends to occur at the collision with structures including the fan grille that are located downstream of the axial-flow fan 100. Furthermore, as described above, the fan input is reduced.

In the outdoor unit 50, the second region 22*b* where the trailing edge 22 has the downward convex portion UD has a convex shape protruding in the direction opposite to the rotating direction DR of the vane 20. The axial-flow fan 100 configured as above exerts the viscosity of the vane surface and thus induces the airflow toward the second region 22*b* where the trailing edge 22 has the downward convex portion UD. Therefore, the air blown from the axial-flow fan 100 of the outdoor unit 50 produces a wind-speed distribution WL that is even in the radial direction. Consequently, the outdoor unit 50 generates reduced noise that tends to occur at the collision with structures including the fan grille that are located downstream of the axial-flow fan 100. Furthermore, the fan input to the axial-flow fan 100 is reduced.

Embodiment 12

Figure 41:
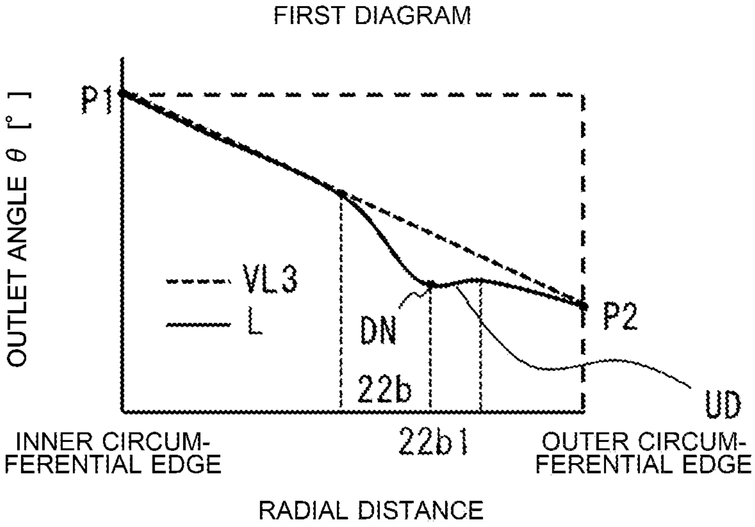
FIG. 41 illustrates the relationship between the radial distance and the size of the outlet angle θ in an axial-flow fan according to Embodiment 12.

FIG. 41 illustrates the relationship between the radial distance and the size of the outlet angle θ in an axial-flow fan 100 according to Embodiment 12. Elements that have the same configurations as those of the axial-flow fan 100 and the outdoor unit 50 illustrated in any of FIGS. 1 to 40 are denoted by corresponding ones of the reference signs, and the description of such elements is omitted.

FIG. 41 provides a third virtual line chart VL3, which is a linear virtual line connecting a point P1 and a point P2. The point P1 represents the size of the outlet angle θ formed at a point of the trailing edge 22 that is at the inner circumferential edge 24 in the axial-flow fan 100. The point P2 represents the size of the outlet angle θ formed at a point of the trailing edge 22 that is at the outer circumferential edge 23. The third virtual line chart VL3 has a linear shape representing that the outlet angle θ decreases at a constant rate from the inner circumferential edge 24 to the outer circumferential edge 23.

In view of the outlet angle θ, the axial-flow fan 100 according to Embodiment 1 is shaped such that the vane load to be borne is greater at a region that is divided by the downward convex portion UD and is close to the inner circumference than at a region that is divided by the downward convex portion UD and is close to the outer circumference. In contrast, the axial-flow fan 100 according to Embodiment 12 is shaped in view of the outlet angle θ such that the vane load to be borne is greater at a region that is divided by the downward convex portion UD and is close to the outer circumference than at a region that is divided by the downward convex portion UD and is close to the inner circumference. In other words, in the vane 20 as a whole, the axial-flow fan 100 according to Embodiment 12 is shaped such that the outlet angle θ formed at the trailing edge 22 is smaller at the region close to the outer circumferential edge 23 than at the region close to the inner circumferential edge 24. The axial-flow fan 100 may include such vanes 20 each forming the outlet angle θ described in Embodiment 12.

The axial-flow fan 100 according to Embodiment 12 includes vanes 20 each forming the first line chart L illustrated in the first diagram in FIG. 41. As illustrated in FIG. 41, the first line chart L includes a downward convex portion UD, which is convex further downward than the third virtual line chart VL3.

[Operational Effects of Axial-Flow Fan 100 and Outdoor Unit 50]

In the axial-flow fan 100 including the vanes 20 each including the downward convex portion, the vane load to be borne at the inner circumference is increased satisfactorily relative to the vane load to be borne at the outer circumference. Accordingly, the airflow on the vane surface is induced toward the inner circumference. Therefore, the air blown from the axial-flow fan 100 produces a wind-speed distribution that is even in the radial direction. Consequently, the axial-flow fan 100 and the outdoor unit 50 each generate reduced noise that tends to occur at the collision with structures including the fan grille that are located downstream of the axial-flow fan 100. Furthermore, the fan input is reduced.

The configurations according to the embodiments described above are only exemplary and may be combined in any manner. The configurations according to the embodiments described above may be combined with any of other known technologies and may be partly changed or omitted without departing from the essence.

REFERENCE SIGNS LIST

10: hub, 20: vane, 20L: vane, 21: leading edge, 21*b*: leading-edge load-bearing point, 21*c*: leading-edge outer circumferential point, 21*q*: region, 21*r*: convex part, 21*s*: region, 22: trailing edge, 22*a*: first region, 22*b*: second region, 22*b*1: peak, 22*c*: third region, 22*d*: trailing-edge inner circumferential point, 22*e*: trailing-edge outer circumferential point, 22*g*: preceding region, 22*m*: leading-edge peak, 23: outer circumferential edge, 24: inner circumferential edge, 25: pressure surface, 26: suction surface, 50: outdoor unit, 50L: outdoor unit, 50R: outdoor unit, 50S: outdoor unit, 51: housing, 51*a*: lateral wall, 51*i*1: opening, 51*b*: front wall, 51*c*: lateral wall, 51*d*: rear wall, 51*e*: top plate, 51*f*: bottom plate, 51*g*: partition, 53: air outlet, 54: fan grille, 54*a*: bar, 56: fan chamber, 57: machine chamber, 61: motor, 62: rotary shaft, 63: bell mouth, 63*a*: inlet portion, 63*b*: straight portion, 63*c*: outlet portion, 63*d*: opening, 64: compressor, 66: board box, 67: control circuit board, 68: heat exchanger, 69: motor support, 70: air-conditioning apparatus, 71: refrigerant circuit, 72: condenser, 72*a*: condenser fan, 73: evaporator, 73*a*: evaporator fan, 74: expansion valve, 100: axial-flow fan, 100L: axial-flow fan, 100R: axial-flow fan, AL: radial area, AR: arrow, CD: circumferential direction, CL: center position, D1: region, D2: linear portion, DN: minimal possible point, DR: rotating direction, F: white arrow, FP: inflow air, FS: arrow, GF: point, JL: solid line, L: first line chart, L2: second line chart, LA: virtual line, LB: virtual line, LC: virtual line, LD: virtual line, LI: first linear portion, LI1: third linear portion, LO: second linear portion, LO2: fourth linear portion, MA: maximal possible point, OD: opposite rotating direction, RA: rotation axis, RD: rotating direction, RS: rotation axis, UD: downward convex portion, UM: upward convex portion, VL: first virtual line chart, VL2: second virtual line chart, VL3: third virtual line chart, W1: first direction, WL: wind-speed distribution, WS: vane section, WS1: vane section, WS2: vane section, WS3: vane section, α: inlet angle, α1: inlet angle, α2: inlet angle, αL: inlet angle, αS: inlet angle, θ: outlet angle, θ1: outlet angle, θ2: outlet angle, θ3: outlet angle, θL: outlet angle, θS: outlet angle, θn: outlet angle

The invention claimed is:

1. An axial-flow fan to be included in an outdoor unit for an air-conditioning apparatus, the axial-flow fan comprising:

a hub that is to be rotated and defines a rotation axis; and a vane provided on a circumference of the hub, the vane including a leading edge forming an edge located forward in a rotating direction, a trailing edge forming an edge located backward in the rotating direction, an outer circumferential edge forming an edge at an outer circumference of the vane, and an inner circumferential edge connected to the hub and forming an edge at an inner circumference that is further inside than an outermost circumference of the vane, in a section of the vane that is along an axial direction of the rotation axis and along a circumferential direction of the axial-flow fan, in a case in which an angle formed between a virtual line intersecting the trailing edge and being parallel to the rotation axis and a virtual line representing a direction in which the trailing edge faces is defined as an outlet angle of the vane, a first diagram is set in which a horizontal axis represents a distance on the trailing edge in a radial direction of the axial-flow fan from the inner circumferential edge to the outer circumferential edge while a vertical axis represents a size of the outlet angle, and a relationship between the size of the outlet angle and the distance on the trailing edge in the radial direction from the inner circumferential edge is represented as a first line chart, the vane being shaped such that the first line chart in the first diagram includes a downward convex portion that is convex further downward than a first virtual line chart, the first virtual line chart being a linear line connecting a point representing a size of the outlet angle formed at a point of the trailing edge that is at the inner circumferential edge and a point representing a size of the outlet angle formed at a point of the trailing edge that is at the outer circumferential edge, the first virtual line chart being a linear line representing that the outlet angle increases at a constant rate from the inner circumferential edge to the outer circumferential edge.

2. The axial-flow fan of claim 1, wherein the downward convex portion is located closer to the inner circumference than a center position of the vane in the radial direction of the axial-flow fan.

3. The axial-flow fan of claim 1, wherein the vane includes a first linear portion in the first line chart, the first linear portion extending linearly between the inner circumferential edge and the downward convex portion.

4. The axial-flow fan of claim 1, wherein the vane includes a second linear portion in the first line chart, the second linear portion extending linearly between the outer circumferential edge and the downward convex portion.

5. The axial-flow fan of claim 3, wherein the downward convex portion includes a linear portion that has a gentle inclination to the first linear portion and is continuous with the first linear portion.

6. The axial-flow fan of claim 1, wherein the downward convex portion has a minimal possible point where the outlet angle is minimal possible.

7. The axial-flow fan of claim 6, wherein, in the section of the vane that is along the axial direction of the rotation axis and along the circumferential direction of the axial-flow fan, in a case in which an angle formed between a virtual line intersecting the leading edge and being parallel to the rotation axis and a virtual line representing a direction in which the leading edge faces is defined as an inlet angle of the vane, and a second diagram is set in which a horizontal axis represents a distance on the leading edge in the radial direction of the axial-flow fan from the inner circumferential edge to the outer circumferential edge while a vertical axis represents a size of the inlet angle, and a relationship between the size of the inlet angle and the distance on the leading edge in the radial direction from the inner circumferential edge is represented as a second line chart, the vane is shaped such that a size of the inlet angle formed at a point in the second line chart that is at a distance equal to a radial distance of the minimal possible point of the outlet angle represented in the first line chart is smaller than a size of the inlet angle formed at a point of the leading edge that is at the outer circumferential edge.

8. The axial-flow fan of claim 7, wherein in a case in which a direction along the axial direction and oriented from the leading edge toward the trailing edge is defined as a direction of airflow, a part of the leading edge that forms the inlet angle at the point in the second line chart that is at a distance equal to the radial distance of the minimal possible point of the outlet angle represented in the first line chart is defined as a leading-edge load-bearing point, and a point of the leading edge that is at the outer circumferential edge is defined as a leading-edge outer circumferential point, the leading-edge load-bearing point is located downstream of the leading-edge outer circumferential point in the direction of the airflow.

9. The axial-flow fan of claim 7, wherein the vane is shaped such that the second line chart in the second diagram includes at least one upward convex portion that is convex further upward than a second virtual line chart, the second virtual line chart being a linear line connecting a point representing a size of the inlet angle formed at a point of the leading edge that is at the inner circumferential edge and a point representing a size of the inlet angle formed at a point of the leading edge that is at the outer circumferential edge, and wherein the leading edge includes a convex part forming the at least one upward convex portion and being located in the radial direction closer to the outer circumference of the vane than a part of the trailing edge where the minimal possible point is defined.

10. The axial-flow fan of claim 9, wherein the at least one upward convex portion has a maximal possible point where a maximal possible value is defined.

11. The axial-flow fan of claim 6, wherein the vane is shaped such that the outlet angle at the minimal possible point in the first diagram where the outlet angle is minimal possible is smaller than the outlet angle formed at a point of the trailing edge that is at the inner circumferential edge.

12. An outdoor unit for an air-conditioning apparatus, the outdoor unit comprising:

a housing including a wall having an air outlet;

the axial-flow fan of claim 1 that is housed in the housing; and a bell mouth provided at the air outlet and surrounding an outer circumference of the axial-flow fan.

13. The outdoor unit for an air-conditioning apparatus of claim 12, wherein the bell mouth extends in the axial direction of the rotation axis and includes an inlet portion, a straight portion, and an outlet portion that are arranged from an upstream region toward a downstream region of airflow, the airflow being generated in a first direction by the axial-flow fan and traveling from an inside of the housing to an outside of the housing through an opening of the bell mouth, wherein the inlet portion has an opening diameter that is greater at the upstream region of the airflow than at the downstream region of the airflow in the first direction, wherein the straight portion is shaped as a straight pipe whose opening diameter is constant in the first direction, wherein the outlet portion has an opening diameter that is greater at the downstream region of the airflow than at the upstream region of the airflow in the first direction, and wherein a part of the trailing edge where the downward convex portion is formed is located at such a position in the axial direction of the rotation axis as to be covered by the straight portion.

14. The outdoor unit for an air-conditioning apparatus of claim 13, wherein a part of the trailing edge that is connected to the hub is located upstream of the straight portion in a direction of the airflow and at such a position in the axial direction as not to be covered by the straight portion.

15. The outdoor unit for an air-conditioning apparatus of claim 12, wherein a part of the trailing edge where the downward convex portion is formed has a convex shape protruding in the axial direction toward a downstream region of the airflow.

16. The outdoor unit for an air-conditioning apparatus of claim 12, wherein, at a region closer to the outer circumference than a part where the downward convex portion is formed, the trailing edge is shifted upstream of the airflow while extending from the part where the downward convex portion is formed to the outer circumferential edge.

17. The outdoor unit for an air-conditioning apparatus of claim 12, the outdoor unit further comprising a motor support that supports a motor configured to rotate the hub, wherein at least a part of the motor support overlaps the vane in the axial direction, and wherein, in a top view of the outdoor unit, a part of the trailing edge where the downward convex portion is formed is located at such a position as to overlap the motor support in the axial direction.

18. The outdoor unit for an air-conditioning apparatus of claim 12, the outdoor unit further comprising a fan grille provided at the air outlet and that prevents insertion of a hand finger of any person into the housing, wherein the fan grille includes, among bars, a plurality of bars that each extend in a horizontal direction and are arranged in a vertical direction, the fan grille being located downstream of the axial-flow fan in a direction of the airflow, and wherein, in a front view of the outdoor unit, when the vane rotates and the trailing edge of the vane passes by any of the plurality of bars of the fan grille, a region of the vane that is located at a region closer to the outer circumference than a part where the downward convex portion is formed passes by the any of the plurality of bars of the fan grille earlier than the part where the downward convex portion is formed.

19. The outdoor unit for an air-conditioning apparatus of claim 18, wherein a part of the trailing edge where the downward convex portion is formed has a convex shape protruding in a direction opposite to the rotating direction of the vane.

* * * * *